(12) United States Patent
Ramasamy et al.

(10) Patent No.: US 11,558,238 B1
(45) Date of Patent: Jan. 17, 2023

(54) ELECTRONIC SYSTEM FOR DYNAMIC LATENCY REDUCTION THROUGH EDGE COMPUTATION BASED ON A MULTI-LAYERED MECHANISM

(71) Applicant: BANK OF AMERICA CORPORATION, Charlotte, NC (US)

(72) Inventors: Suki Ramasamy, Tamil Nadu (IN); Mudit Chawla, Haryana (IN); Balamurali Lakshminarayanan, Tamil Nadu (IN); Payal Mattoo, Maharashtra (IN); Sudharsan Ramadurai, Tamil Nadu (IN); Vidhya Ramanathan, Tamil Nadu (IN); Sivasundaram Umapathy, Tamil Nadu (IN); Vinu Viswanathan, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/571,451

(22) Filed: Jan. 8, 2022

(51) Int. Cl.
| | |
|---|---|
| *H04L 41/0604* | (2022.01) |
| *H04L 41/0654* | (2022.01) |
| *H04L 43/0817* | (2022.01) |
| *H04L 43/0894* | (2022.01) |
| *H04L 43/0864* | (2022.01) |

(52) U.S. Cl.
CPC ...... *H04L 41/0627* (2013.01); *H04L 41/0654* (2013.01); *H04L 43/0817* (2013.01); *H04L 43/0864* (2013.01); *H04L 43/0894* (2013.01)

(58) Field of Classification Search
None
See application file for complete search history.

(56) References Cited

U.S. PATENT DOCUMENTS

| | | | |
|---|---|---|---|
| 4,642,782 A | 2/1987 | Kemper et al. |
| 5,107,497 A | 4/1992 | Lirov et al. |
| 5,309,448 A | 5/1994 | Bouloutas et al. |
| 5,949,677 A | 9/1999 | Ho |
| 5,950,183 A | 9/1999 | Minobe et al. |
| 6,012,152 A | 1/2000 | Douik et al. |
| 6,170,065 B1 | 1/2001 | Kobata et al. |
| 6,353,902 B1 | 3/2002 | Kulatunge et al. |
| 6,615,367 B1 | 9/2003 | Unkle et al. |
| 6,715,097 B1 | 3/2004 | Kidder et al. |

(Continued)

*Primary Examiner* — John A Follansbee
*Assistant Examiner* — Kamal M Hossain
(74) *Attorney, Agent, or Firm* — Moore & Van Allen PLLC; Vaidehi Bachoti

(57) ABSTRACT

Embodiments of the invention are directed to a system, method, or computer program product for dynamic latency reduction through edge computation based on a multi-layered mechanism. In this regard, the invention is structured for proactive de-centralized monitoring and resolution of network issue events and cross-pollination of resolutions of network issue events between network components and dynamic reallocation of technology resources therebetween for load balancing. In some embodiments, the invention comprises an entity communication network comprising a plurality of network device groups, one or more edge nodes, and a central server system. The invention determines, via an edge node, a first resolution vector for a first network issue event. The invention is configured to implement, via a micro edge adaptor of a first component system, the first resolution vector at a component system.

19 Claims, 8 Drawing Sheets

(56) References Cited

U.S. PATENT DOCUMENTS

| | | |
|---|---|---|
| 7,051,243 B2 | 5/2006 | Helgren et al. |
| 7,900,201 B1 | 3/2011 | Qureshi et al. |
| 8,161,325 B2 | 4/2012 | Calman et al. |
| 8,578,342 B2 | 11/2013 | Artzi et al. |
| 8,943,478 B2 | 1/2015 | Artzi et al. |
| 9,084,937 B2 | 7/2015 | Gadher et al. |
| 9,485,712 B1 | 11/2016 | Hoffner et al. |
| 9,794,797 B2 | 10/2017 | Hoffberg |
| 9,983,871 B1 | 5/2018 | Edwards et al. |
| 10,567,495 B2 | 2/2020 | Gandhi et al. |
| 11,159,628 B1 | 10/2021 | Gupta et al. |
| 11,163,633 B2 | 11/2021 | Bangad et al. |
| 2003/0033379 A1 | 2/2003 | Civanlar et al. |
| 2003/0225520 A1 | 12/2003 | Hoglund et al. |
| 2006/0101402 A1 | 5/2006 | Miller et al. |
| 2006/0218267 A1 | 9/2006 | Khan et al. |
| 2009/0119649 A1 | 5/2009 | Jegoulev et al. |
| 2011/0016360 A1 | 1/2011 | Borghetti et al. |
| 2012/0221898 A1 | 8/2012 | Suit |
| 2013/0179865 A1 | 7/2013 | Neumeyer et al. |
| 2017/0251385 A1 | 8/2017 | Fox et al. |
| 2018/0196717 A1 | 7/2018 | Gangadhar |
| 2021/0089377 A1* | 3/2021 | Wang ............... G06F 11/079 |
| 2021/0144517 A1* | 5/2021 | Guim Bernat ........ H04W 12/04 |
| 2021/0306372 A1* | 9/2021 | Koral ..................... H04L 43/16 |

\* cited by examiner

ELECTRONIC SYSTEM FOR DYNAMIC LATENCY REDUCTION THROUGH EDGE COMPUTATION BASED ON A MULTI-LAYERED MECHANISM

FIELD OF THE INVENTION

The present invention is directed to network infrastructure monitoring and issue remediation. In particular, the present invention embraces a novel approach for dynamic latency reduction through edge computation.

BACKGROUND

Entities typically employ various network architectures comprising modems, hubs, switches, routers, load balancers, network hosts, servers, proxy servers, input/output devices, network terminals and computers and the like. Typically, the devices in the network architecture run a plurality of technology applications for facilitating and performing a myriad of tasks and activities associated with the entity. These technology applications generate vast volumes of data flow across the network nodes. However, with existing network architectures, application/system monitoring may be performed, if at all, only via a central system, such as a central cloud system. However, while having an undesirably high latency of resolution of issues/errors in the network and large implementation times for resolutions to alleviate the issues/errors, the central system based monitoring of conventional systems may be ineffective in complex networks with a large number of applications and devices. Moreover, conventional systems typically lack the ability for intelligent correlation between disparate parts of the network architecture.

The previous discussion of the background to the invention is provided for illustrative purposes only and is not an acknowledgement or admission that any of the material referred to is or was part of the common general knowledge as at the priority date of the application.

SUMMARY

In one aspect, the present invention is directed to in general a system, method and computer program product for dynamic latency reduction through edge computation based on a multi-layered mechanism. The system is structured for proactive de-centralized monitoring and resolution of network issue events and cross-pollination of resolutions of network issue events between network components and dynamic reallocation of technology resources therebetween for load balancing. The system typically includes an entity communication network comprising a plurality of network device groups associated with a first layer of the entity communication network, wherein each network device group of the plurality of network device groups comprises a plurality of component systems, wherein each component system of the plurality of component systems is in operative communication with an associated micro edge adaptor. The entity communication network further comprises one or more edge nodes associated with a second layer of the entity communication network, wherein each edge node of the one or more edge nodes is in operative communication with at least one of the plurality of network device groups. The entity communication network further comprises a central server system associated with a third layer of the entity communication network, wherein the central server system is in operative communication with the one or more edge nodes. Embodiments of the invention further comprise a memory device with computer-readable program code stored thereon, a communication device, wherein the communication device is configured to establish operative communication with a plurality of networked devices via the entity communication network, and a processing device operatively coupled to the memory device and the communication device, wherein the processing device is configured to execute the computer-readable program code. That said, in some embodiments, the invention takes the form of a computer program product comprising one or more non-transitory computer-readable storage media having computer-executable instructions that when executed by one or more processing devices are configured to cause the one or more processing devices to perform one or more functions described below. In some embodiments, the invention takes the form of a method for performing one or more functions described below.

Typically, in some embodiments of the invention, the processing device is configured to execute the computer-readable program code to: retrieve, via a first edge node of the one or more edge nodes, first application logs associated with the plurality of component systems of a first network device group of the plurality of network device groups; determine a first network issue event associated with a first component system of the first network device group based on analyzing the first application logs; transform, via the first edge node of the one or more edge nodes, the first application logs into a first event vector, wherein the first event vector comprises a plurality of event parameters associated with the first network issue event; transform, via the first edge node of the one or more edge nodes, a plurality of resolution actions into one or more resolution vectors, wherein each of the one or more resolution vectors comprise a plurality of resolution parameters; determine, via the first edge node of the one or more edge nodes, a first resolution vector of the one or more resolution vectors for the first network issue event based on identifying a match between at least a portion of the first event vector and the first resolution vector; transform, via the first edge node of the one or more edge nodes, the first resolution vector into one or more solution instruction actions; transmit, from the first edge node of the one or more edge nodes, the one or more solution instruction actions of the first resolution vector to a first micro edge adaptor of the first component system of the first network device group associated with the first network issue event; and implement, via the first micro edge adaptor of the first component system, the one or more solution instruction actions of the first resolution vector at the first component system of the first network device group.

In another embodiment, and in combination with any of the previous embodiments, the invention is configured to: store the first application logs at an edge log store of the first edge node; and analyze, via the first edge node of the one or more edge nodes, the first application logs.

In another embodiment, and in combination with any of the previous embodiments, the invention is configured to: determine a match between the first application logs and a prior application log associated with a prior network issue event; and in response to determining the match, determine that the first network device group is associated with the first network issue event.

In another embodiment, and in combination with any of the previous embodiments, determining the first resolution vector further comprises determining that the first resolution vector is compatible with a priority parameter, a resource utilization parameter, a dependency parameter, a real-time condition parameter, and/or past event parameter associated with the first network device group.

In another embodiment, and in combination with any of the previous embodiments, the first micro edge adaptor of the first component system, is structured to store one or more frequent resolution vectors at the first micro edge adaptor for implementation at the first component system.

In another embodiment, and in combination with any of the previous embodiments, the first micro edge adaptor of the first component system is structured to transform the one or more solution instruction actions of the first resolution vector into a first technology format compatible with the first component system; and transmit the transformed one or more solution instruction actions to the first component system.

In another embodiment, and in combination with any of the previous embodiments, the invention is configured to: determine, via the first edge node of the one or more edge nodes, one or more auxiliary preventative instruction actions associated with the first network issue event; transmit, from the first edge node of the one or more edge nodes, the one or more auxiliary preventative instruction actions to the first micro edge adaptor of the first component system of the first network device group; and implement, via the first micro edge adaptor of the first component system, auxiliary preventative instruction actions at the first component system of the first network device group.

In another embodiment, and in combination with any of the previous embodiments, the invention is configured to: determine, via the first edge node of the one or more edge nodes, current resource parameters of the plurality of network device groups; and transmit custom load-balancing instructions to the plurality of network device groups in response to determining a resource imbalance at the plurality of network device groups.

In another embodiment, and in combination with any of the previous embodiments, the invention is configured to: aggregate, via the first edge node of the one or more edge nodes, the first application logs to determine a first pattern associated with the first network issue event associated with the first network device group; and correlate, via the first edge node of the one or more edge nodes, the first pattern associated with the first network issue event with the plurality of resolution actions.

In another embodiment, and in combination with any of the previous embodiments, the invention is configured to: analyze, via the first edge node of the one or more edge nodes, the first application logs to determine a second pattern associated with a second network issue event associated with the first network device group; transform, via the first edge node of the one or more edge nodes, the first application logs into one or more second event vectors, wherein the one or more second event vectors comprise a plurality of event parameters associated with the second network issue event; determine, via the first edge node of the one or more edge nodes, that correlation of the one or more second event vectors is unsuccessful; transmit, from the first edge node, the one or more second event vectors to the central server system; analyze, via the central server system, the one or more second event vectors; and determine, via the central server system, one or more second resolution actions for the one or more second event vectors.

In another embodiment, and in combination with any of the previous embodiments, the invention is configured to: transmit, via the central server system, the first event vector and the one or more solution instruction actions from the first edge node of the one or more edge nodes to a second edge node of the one or more edge nodes at a predetermined first time interval.

In another embodiment, and in combination with any of the previous embodiments, the invention is configured to: retrieve, via the second edge node of the one or more edge nodes, second application logs associated with the plurality of component systems of a second network device group of the plurality of network device groups; determine a second network issue event associated with a second component system of the second network device group based on analyzing the second application logs at a second time interval after the first time interval; transform, via the second edge node of the one or more edge nodes, the second application logs into a second event vector; in response to determining a match between at least a portion of the first event vector and the second event vector, determine, via the second edge node of the one or more edge nodes, the first resolution vector associated with the first network issue event as a resolution vector for the second event vector; transmit, from the second edge node of the one or more edge nodes, the one or more solution instruction actions of the first resolution vector to a second micro edge adaptor of the second component system of the second network device group associated with the second network issue event; and implement, via the second micro edge adaptor of the second component system, the one or more solution instruction actions of the first resolution vector at the second component system of the second network device group.

In another embodiment, and in combination with any of the previous embodiments, the invention is configured to: retrieve, via the first edge node of the one or more edge nodes, third application logs associated with the plurality of component systems of the first network device group of the plurality of network device groups; determine, via a workflow component, a match between the third application logs and a prior application log associated with a prior network issue event; in response to determining the match, determine that the third application logs are associated with a current network issue event; categorize the current network issue event into an issue category based on one or more event parameters; and determine one or more resolution actions for the current network issue event based on at least a prior resolution action associated with the prior network issue event.

In another embodiment, and in combination with any of the previous embodiments, wherein each of the one or more resolution vectors is associated with a prior network issue event, wherein for each of the one or more resolution vectors, the plurality of resolution parameters comprise (i) data associated with plurality of resolution actions, and (ii) one or more prior event parameters of the associated prior network issue event.

In yet other embodiments of the invention, the processing device is configured to execute the computer-readable program code to: retrieve, via a first edge node of the one or more edge nodes, application logs associated with the plurality of component systems of a first network device group of the plurality of network device groups; aggregate, via the first edge node of the one or more edge nodes, the application logs to determine a first pattern associated with a first network issue event associated with the first network device group; correlate, via the first edge node of the one or more edge nodes, the first pattern associated with the first network issue event with a plurality of resolution actions; transform, via the first edge node of the one or more edge nodes, the application logs into one or more event vectors, wherein the one or more event vectors comprise a plurality of event parameters associated with the first network issue event; transform, via the first edge node of the one or more edge nodes, the plurality of resolution actions into one or more resolution vectors, wherein the one or more resolution vectors comprise a plurality of resolution parameters; determine, via the first edge node of the one or more edge nodes, a first resolution vector of the plurality of resolution vectors based on identifying a match between at least a portion of the one or more event vectors and the first resolution vector; transform, via the first edge node of the one or more edge nodes, the first resolution vector into one or more solution instruction actions; transmit, from the first edge node of the one or more edge nodes, the one or more solution instruction actions of the first resolution vector to a first micro edge adaptor of a first component system of the first network device group associated with the first network issue event; and implement, via the first micro edge adaptor of the first component system, the one or more solution instruction actions of the first resolution vector at the first component system of the first network device group.

In another embodiment, and in combination with any of the previous embodiments, the invention is configured to: store the application logs at an edge log store of the first edge node; and analyze, via the first edge node of the one or more edge nodes, the application logs.

In another embodiment, and in combination with any of the previous embodiments, the invention is configured to: determine, via the workflow component, a match between a second application log of the plurality of application logs and a prior application log associated with a prior network issue event; in response to determining that match, determine that the second application log is associated with a current network issue event; categorize the current network issue event into an issue category based on one or more event parameters; and determine one or more resolution actions for the current network issue event based on at least a prior resolution action associated with the prior network issue event.

In another embodiment, and in combination with any of the previous embodiments, determining the first resolution vector further comprises determining that the first resolution vector is compatible with a priority parameter, a resource utilization parameter, a dependency parameter, a real-time condition parameter, and/or past event parameter associated with the first network device group.

In another embodiment, and in combination with any of the previous embodiments, the first micro edge adaptor of the first component system, is structured to store one or more frequent resolution vectors at the first micro edge adaptor for implementation at the first component system.

In another embodiment, and in combination with any of the previous embodiments, the first micro edge adaptor of the first component system is structured to: transform the one or more solution instruction actions of the first resolution vector into a first technology format compatible with the first component system; and transmit the transformed one or more solution instruction actions to the first component system.

In another embodiment, and in combination with any of the previous embodiments, the invention is configured to: determine, via the first edge node of the one or more edge nodes, one or more auxiliary preventative instruction actions associated with the first network issue event; transmit, from the first edge node of the one or more edge nodes, the one or more auxiliary preventative instruction actions to the first micro edge adaptor of the first component system of the first network device group; and implement, via the first micro edge adaptor of the first component system, auxiliary preventative instruction actions at the first component system of the first network device group.

In another embodiment, and in combination with any of the previous embodiments, the invention is configured to: determine, via the first edge node of the one or more edge nodes, current resource parameters of the plurality of network device groups; and transmit custom load-balancing instructions to the plurality of network device groups in response to determining a resource imbalance at the plurality of network device groups.

In another embodiment, and in combination with any of the previous embodiments, the invention is configured to: determine, via the first edge node of the one or more edge nodes, the application logs to determine a second pattern associated with a second network issue event associated with the first network device group; transform, via the first edge node of the one or more edge nodes, the application logs into one or more second event vectors, wherein the one or more second event vectors comprise a plurality of event parameters associated with the second network issue event; determine, via the first edge node of the one or more edge nodes, that correlation of the one or more second event vectors is unsuccessful; transmit, from the first edge node, the one or more second event vectors to the central server system; analyze, via the central server system, the one or more second event vectors; and determine, via the central server system, one or more second resolution actions for the one or more second event vectors.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
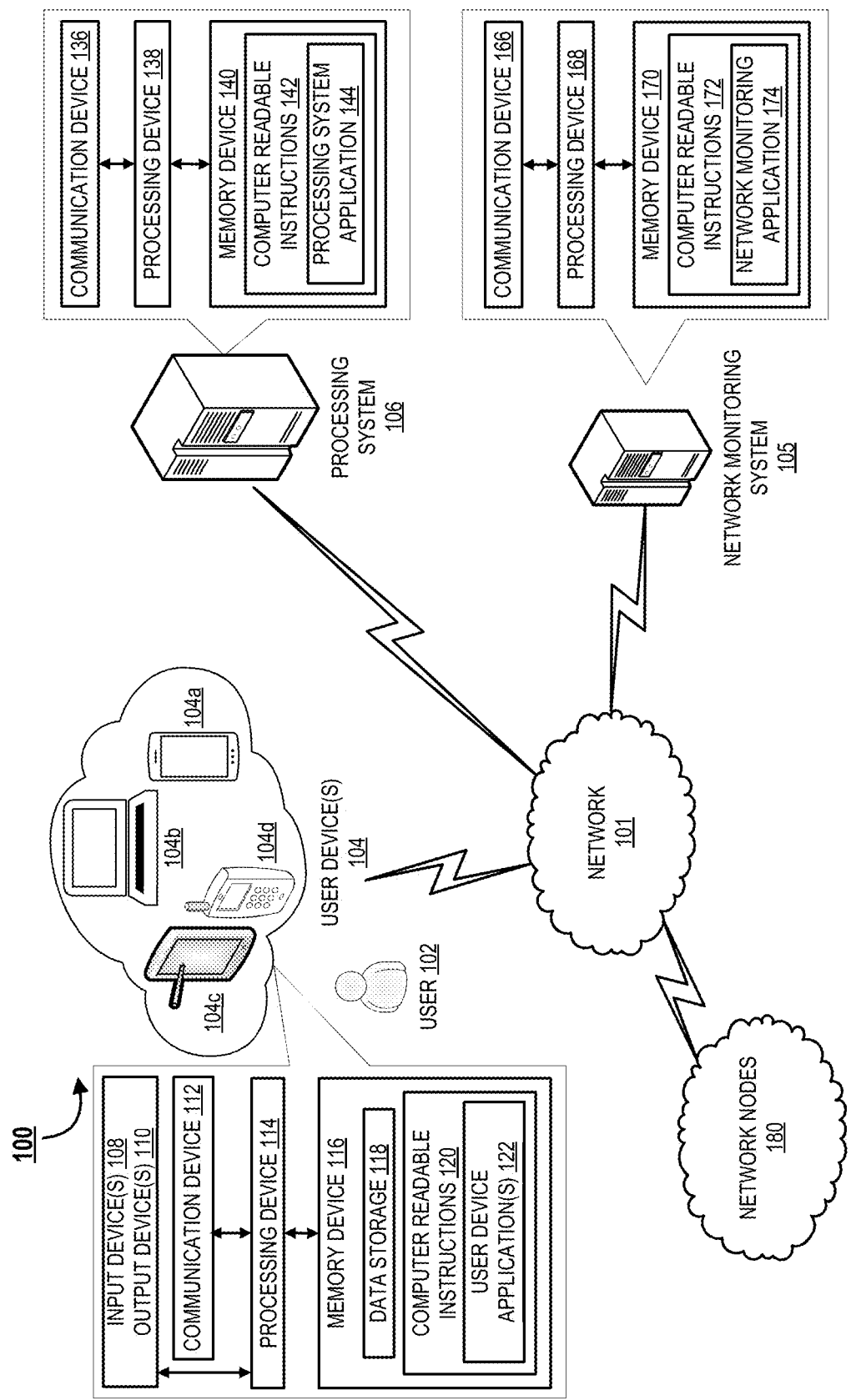
Figure 2A:
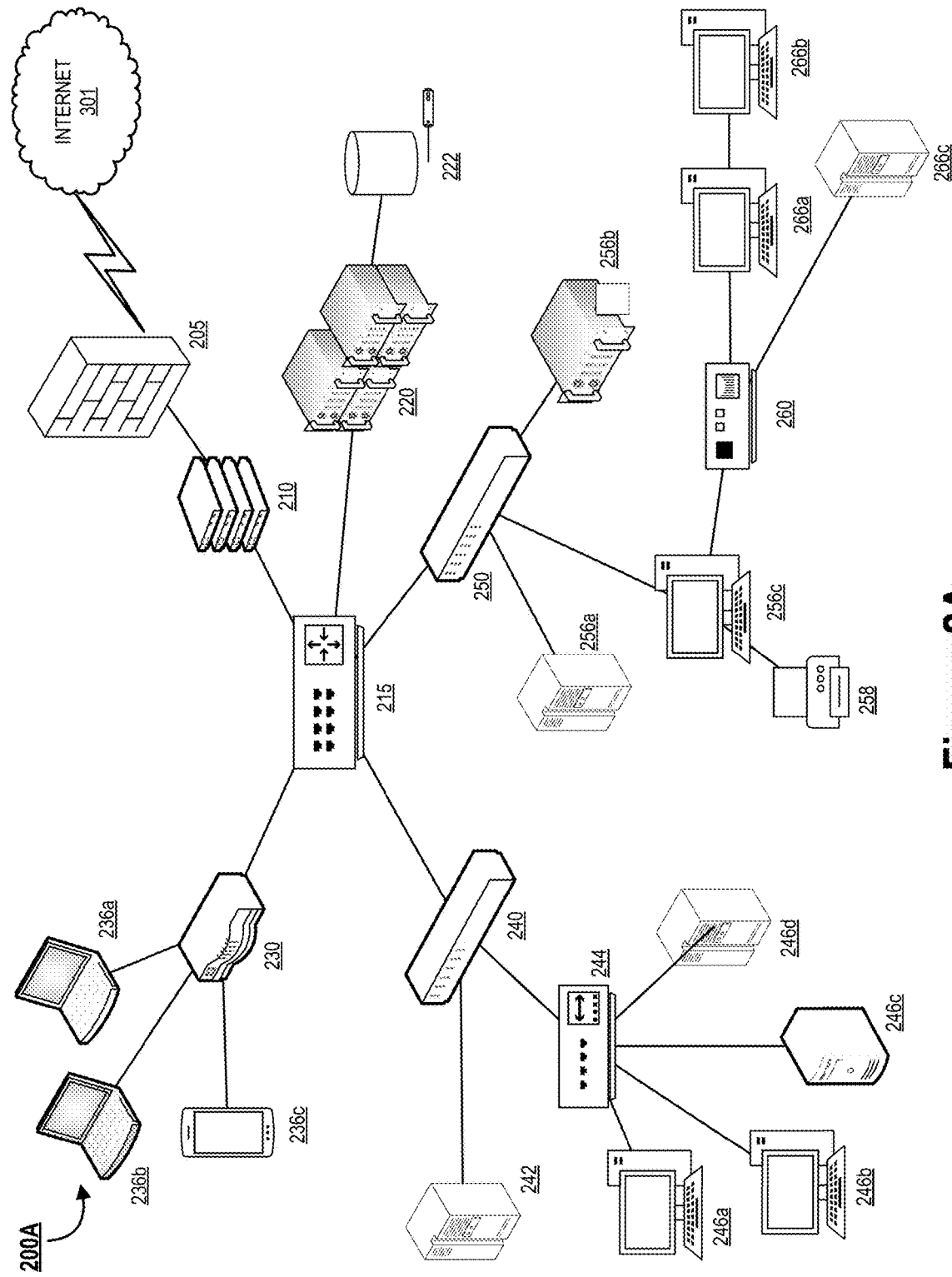
Figure 2B:
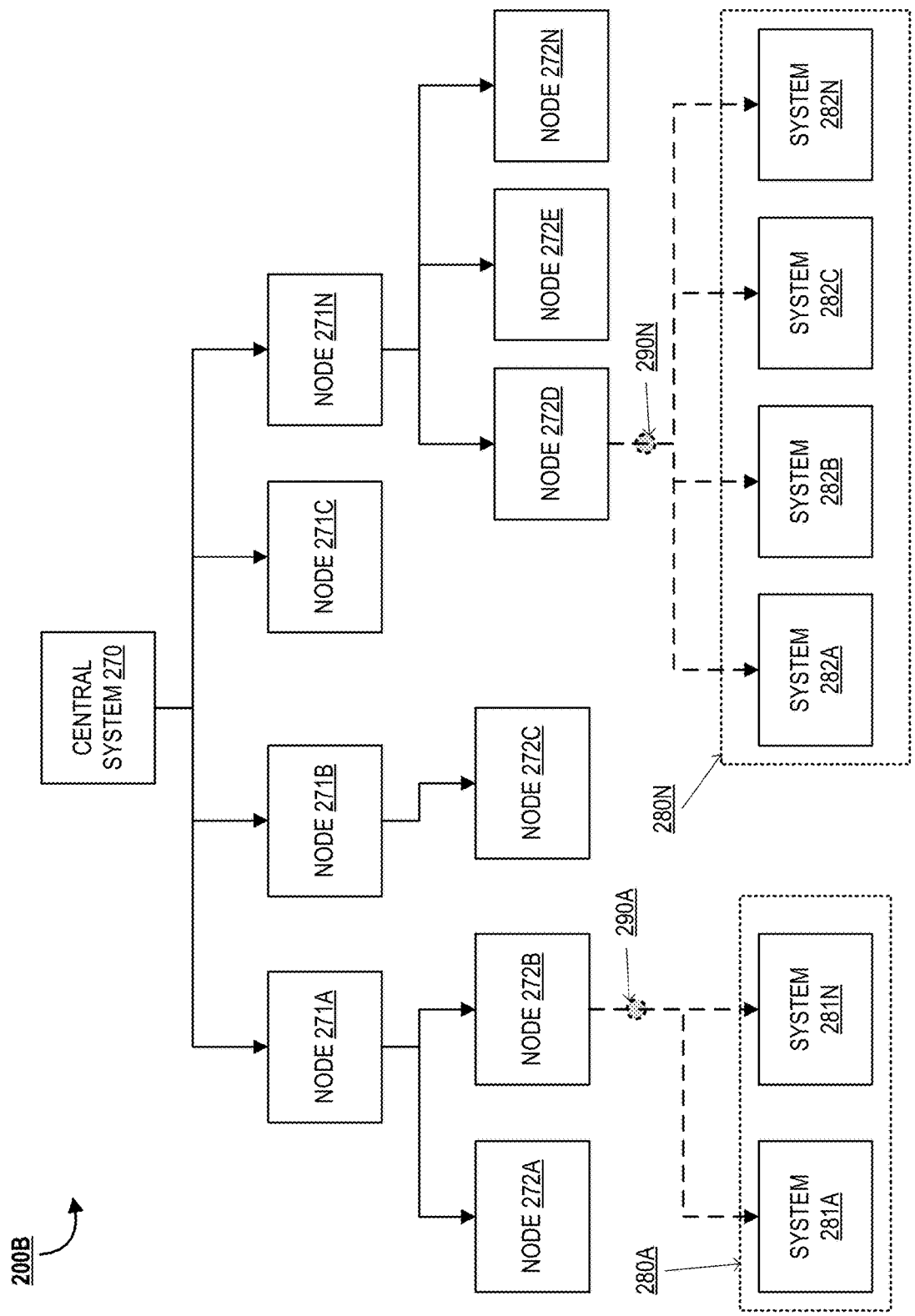
Figure 3:
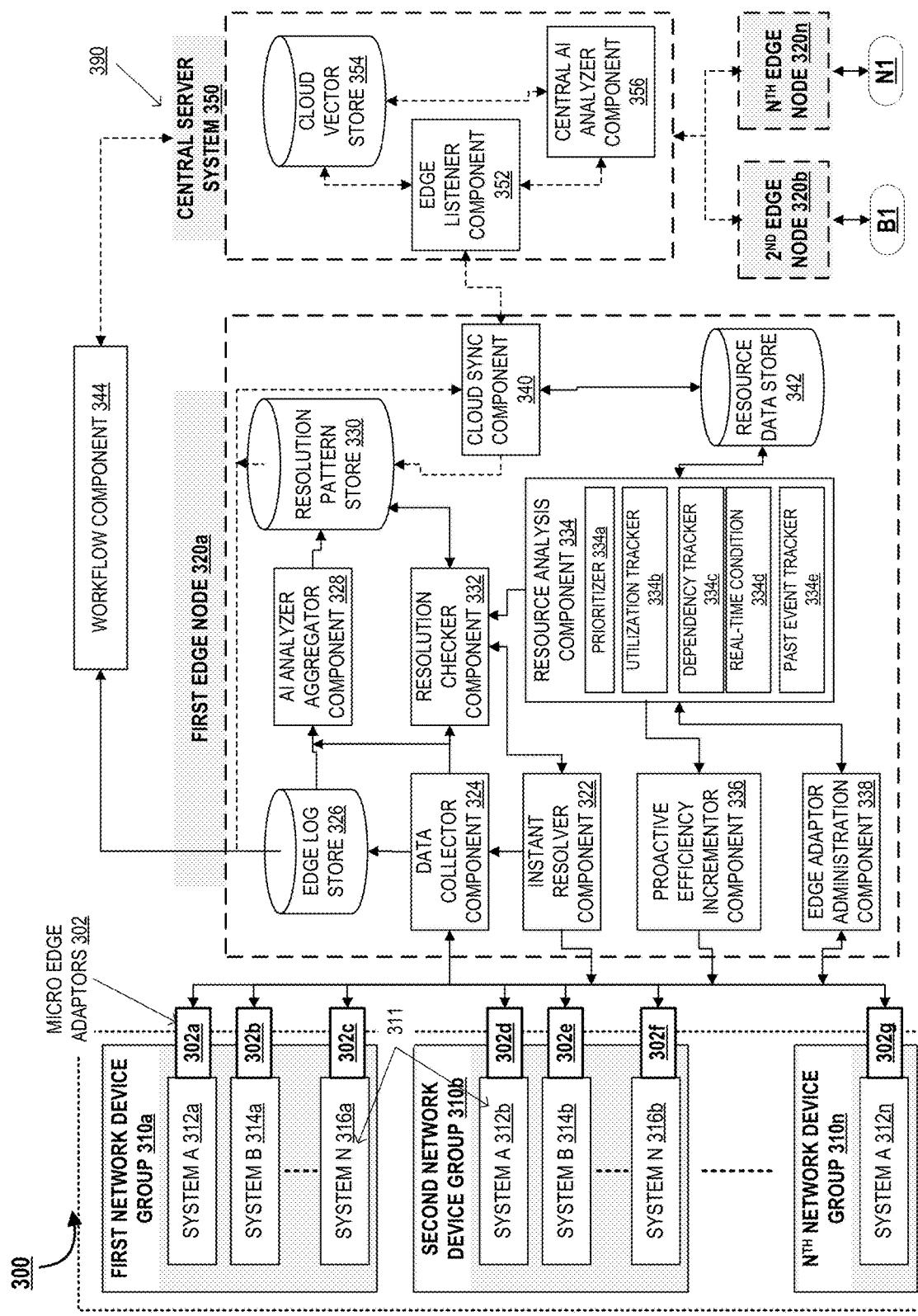
Figure 4A:
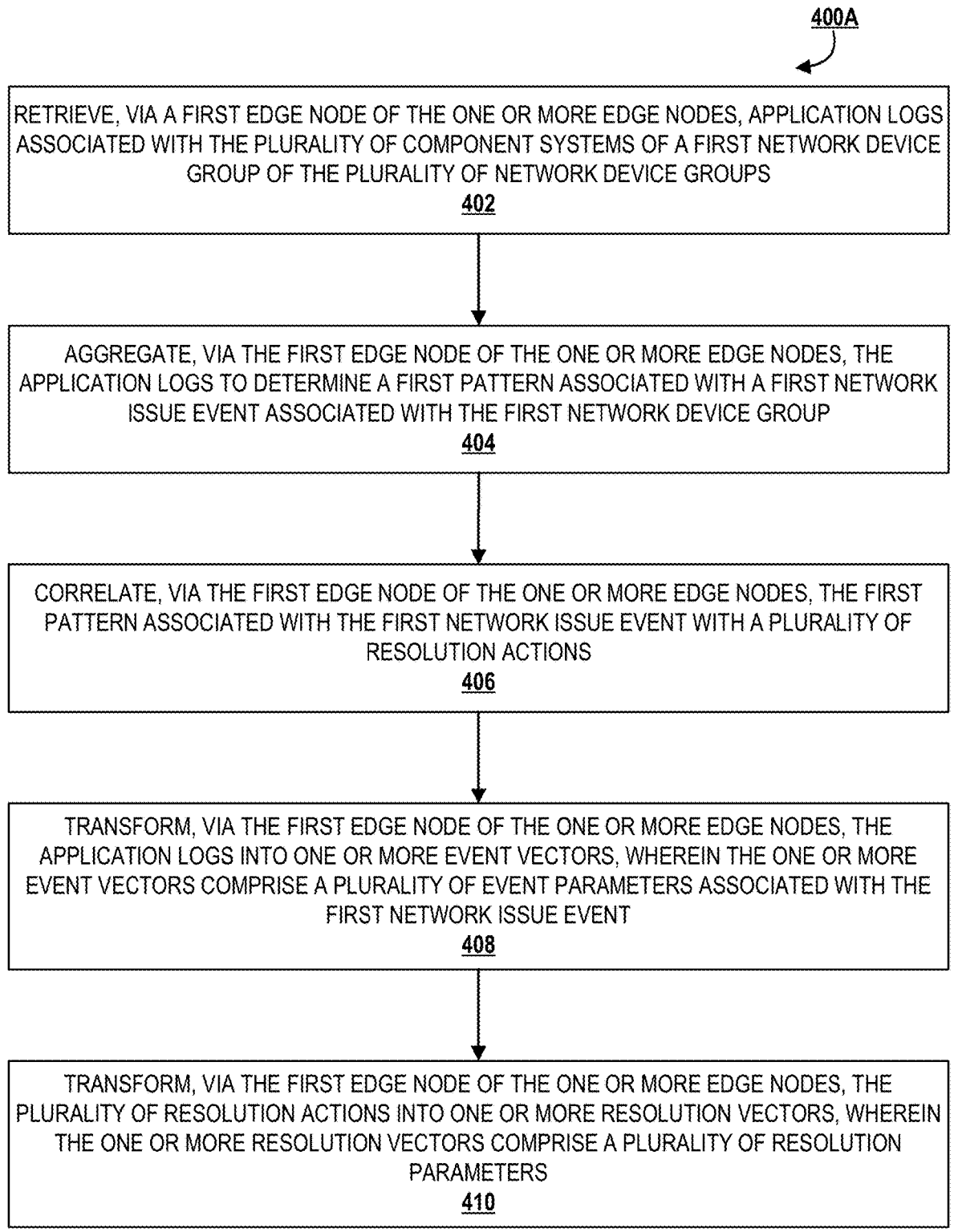
Figure 4B:
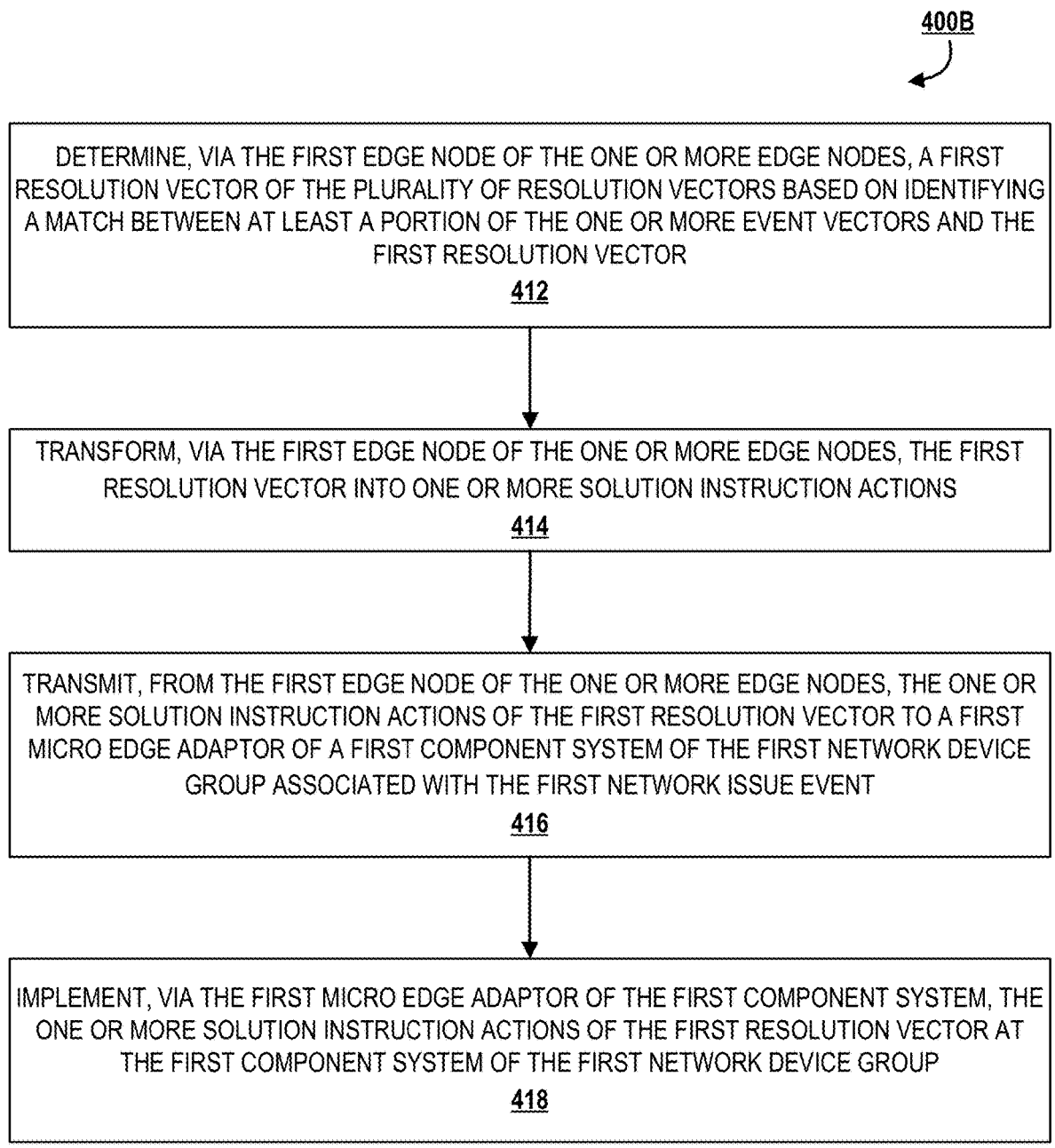
Figure 4C:
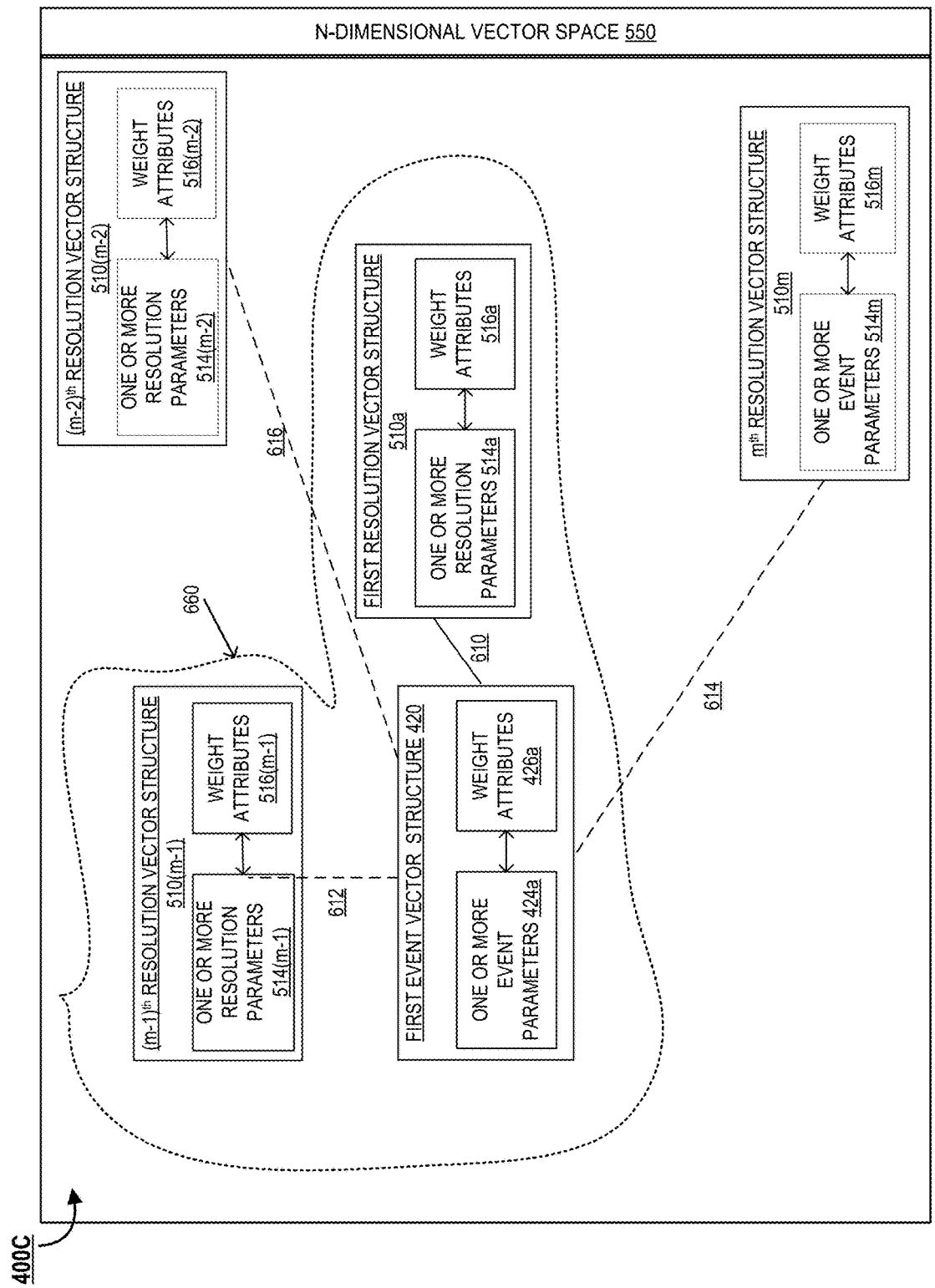
Figure 4D:
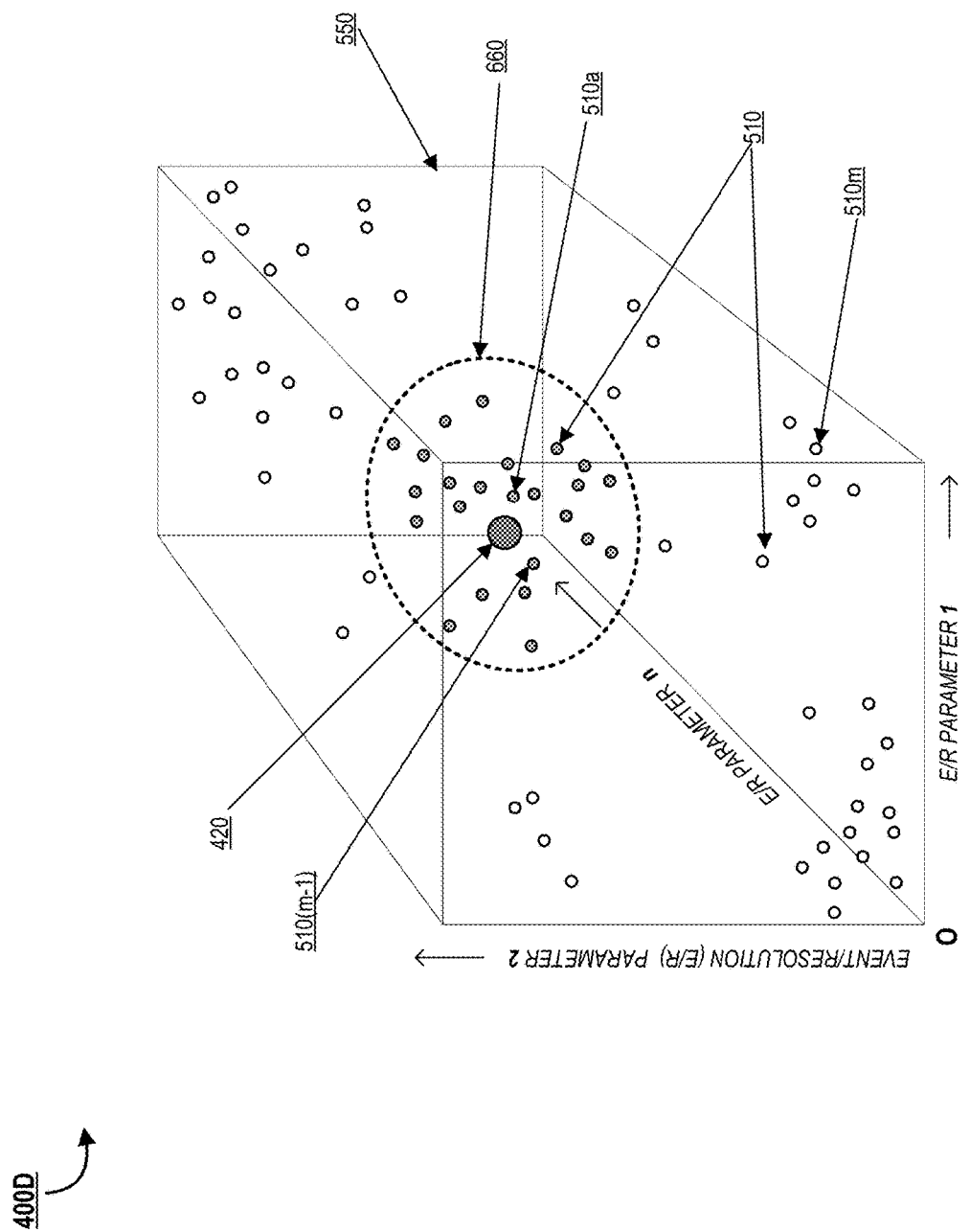

Having thus described embodiments of the invention in general terms, reference will now be made the accompanying drawings, wherein:

FIG. 1 depicts a system environment 100 for dynamic latency reduction through edge computation based on a multi-layered mechanism, in accordance with an aspect of the present invention;

FIG. 2A depicts a non-limiting illustrative example of an entity communication network environment 200A, in accordance with one embodiment of the present invention;

FIG. 2B depicts a non-limiting illustrative example of an entity communication network environment 200B, in accordance with one embodiment of the present invention;

FIG. 3 depicts a schematic block diagram and process flow depiction 300 of an entity communication network environment for dynamic latency reduction through edge computation based on a multi-layered mechanism, in accordance with one embodiment of the invention;

FIG. 4A schematically depicts a high level process flow 400A for dynamic latency reduction through edge computation based on a multi-layered mechanism, in accordance with one embodiment of the invention;

FIG. 4B schematically depicts a high level process flow 400B for dynamic latency reduction through edge computation based on a multi-layered mechanism, in accordance with the embodiment of FIG. 4A;

FIG. 4C illustrates a high level schematic representation 400C of resolution vector matching, in accordance with one embodiment of the invention; and FIG. 4D illustrates a high level schematic representation 400D of resolution vector matching, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be an organization, a company, a group, an institution, a society, an association, an establishment or the like, (e.g., a financial institution, a business concern, a merchant organization, etc.). For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. In other embodiments, an "entity" may not be a financial institution.

Unless specifically limited by the context, a "user activity", "transaction" or "activity" refers to any communication between the user and a financial institution or another entity. In some embodiments, for example, a user activity may refer to a purchase of goods or services, a return of goods or services, a payment transaction, a credit transaction, or other interaction involving a user's bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

The entity may be associated with an entity communication network having nodes, devices, systems, applications, and/or the like in a particular hierarchical arrangement and in operative communication therebetween. A "network issue event" as used herein may refer to an issue, problem, malfunction, failure, breakdown, fault, error, non-optimal performance, undesirable events, and/or the like associated with one or more nodes, devices, systems, applications, and/or other components/parts/devices of the entity communication network. In some embodiments, the cause of a network issue event and the undesirable or adverse effects of the network issue event are associated with the same component/part/device of the entity communication network. In other embodiments, a network issue event caused by a first component/part/device of the entity communication network triggers undesirable or adverse effects in another second component/part/device of the entity communication network.

With advancements in technology infrastructures and wireless communication implementation, entities increasingly employ various network architectures comprising modems, hubs, switches, routers, load balancers, network hosts, servers, proxy servers, input/output devices, network terminals and computers and the like. Typically, the devices in the network architecture run a plurality of technology applications for facilitating and performing a myriad of tasks and activities associated with the entity. These technology applications generate vast volumes of data flow across the network nodes. However, with existing network architectures, it is not possible to track data flows across the network nodes that are associated with a particular technology application, without which functioning of technology applications cannot be evaluated and mitigation steps cannot be implemented. However, with existing network architectures, application/system monitoring may be performed, if at all, only via a central system, such as a central cloud system. However, while having an undesirably high latency of resolution of issues/errors in the network and large implementation times for resolutions to alleviate the issues/errors, the central system based monitoring of conventional systems may be ineffective in complex networks with a large number of applications and devices. Moreover, conventional systems lack the ability for cross-pollination of resolutions between disparate parts of the network architecture.

The present invention provides a solution to the foregoing problems by providing dynamic latency reduction through edge computation based on a multi-layered mechanism. The invention is structured for proactive de-centralized monitoring and resolution of network issue events and cross-pollination of resolutions of network issue events between network components and dynamic reallocation of technology resources therebetween for load balancing.

FIG. 1 illustrates a system environment 100 for dynamic latency reduction through edge computation based on a multi-layered mechanism, in accordance with one embodiment of the present invention. FIG. 1 provides a unique system that includes specialized servers and systems, communicably linked across a distributive network of nodes required to perform the functions of testing data transmission characteristics of the entity communication network and evaluating data flows associated in individual applications, in real-time or near real-time. As illustrated in FIG. 1, a network monitoring system 105 (also referred to as the system 105 in some instances) is operatively coupled, via a network 101 to the user system(s) 104 (e.g., a plurality of user devices 104a-104d), to the processing system 106 (also referred to as a control system 106) and to a plurality of other network nodes. In this way, the network monitoring system 105 can send information to and receive information from the user device(s) 104, the processing system 106 (e.g., a financial institution server) and the plurality of network nodes 180. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and structured for facilitating data flows associated with activities and tasks associated with the entity. The network 101 may also be a global area network (GAN), such as the Internet (301, illustrated in FIG. 2A), a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves, light waves or any other suitable means. In some embodiments, at least a portion of the network 101 is an entity communication network (200A, 200B) associated with the entity, illustrated in FIGS. 2A-2B.

In some embodiments, the network monitoring system 105 and the plurality of network nodes 180, together with the processing system 106 and/or one or more of the user devices 104, constitute the entity communication network (200A, 200B), each forming a network node of the entity communication network (200A, 200B). That said, in other embodiments, it is envisaged that the entity communication network (200A, 200B) comprises the plurality of network nodes 180 which interact with the network monitoring system 105, the processing system 106 and/or one or more of the user devices 104 that are external to the entity communication network (200A, 200B). Typically, the network nodes (e.g., the network nodes 180, the network monitoring system 105, the processing system 106, and/or the user device(s) 104) of the entity communication network (200A, 200B) comprise operative communication channels for communicating with each other, in accordance with the network architecture of the entity communication network, as will be described with respect to FIGS. 2A-2B.

In some embodiments, the user 102 is an individual that has, owns or is otherwise associated with one or more user devices 104, and typically a plurality of user devices 104, that facilitate/allow the user to perform one or more user activities. The user devices typically comprise one or more of a smart phone 104a, a laptop or desktop computer 104b, a mobile phone or a personal digital assistant 104d, a tablet device 104c, wearable smart devices, smart television devices, home controllers, smart speakers, and/or other computing devices. In some embodiments, the user may be associated with a first user device (e.g., the tablet device 104c, a laptop or desktop computer 104b, or another smart/computing device) and a second user device (e.g., the smart phone 104a, or any of the user devices listed above).

FIG. 1 also illustrates a representative user system/device 104. As discussed, the user device(s) 104 may be, for example, a desktop personal computer, a mobile system, such as a cellular phone, smart phone, personal digital assistant (PDA), laptop, or the like, and each of the user devices (e.g., devices 104a-104d) may comprise the technical/electronic components described herein. The user device(s) 104 generally comprises a communication device 112, a processing device 114, a memory device 116, input device(s) 108 and output device(s) 105. The user device 104 may comprise other devices that are not illustrated, configured for location determination/navigation (GPS devices, accelerometers and other positioning/navigation devices), for authentication (fingerprint scanners, microphones, iris scanners, facial recognition devices/software and the like), for image capture (cameras, AR devices, and the like), for display (screens, hologram projectors and the like), and other purposes. The user device 104 is a computing system that enables the user to perform one or more user activities or tasks associated with the entity. The processing device 114 is operatively coupled to the communication device 112, input device(s) 108 (e.g., keypads/keyboards 108a, touch screens 108b, mouse/pointing devices 108c, gesture/speech recognition sensors/devices, microphones, joysticks, authentication credential capture devices listed above, image capture devices, and other peripheral input devices), output device(s) 110 (screens 110a-110b, speakers, printers and other peripheral output devices) and other devices/components of the user device. The processing device 114 uses the communication device 112 to communicate with the network 101 and other devices on the network 101, such as, but not limited to the processing system 106, the network monitoring system 105 and the network nodes 180. As such, the communication device 112 generally comprises a modem, server, or other device for communicating with other devices on the network 101.

Each user device 104a-104d, typically comprises one or more user input devices 108, that are configured to receive instructions, commands, data, authentication credentials, audio/visual input and other forms of user input from the user, and transmit the received user input to the processing device 114 of the user device for processing. Similarly, each user device 104a-104d, typically comprises one or more user output devices 110, that are configured to transmit, display (e.g., via a graphical user interface), present, provide or otherwise convey an user output to the user, based on instructions from the processing device 114 of the user device. In some embodiments, the one or more user input devices 108 and/or one or more user output devices 110 are dual-function devices that are configured to both receive user input from the user and display output to the user (e.g., a touch screen display of a display device). For example, the dual function input devices 108 and/or the output devices 110 may present a user interface associated with one or more user device applications 112 (e.g., a graphical user interface) that is configured to receive user input and also provide user output.

The user device 104 comprises computer-readable instructions 120 and data storage 118 stored in the memory device 116, which in one embodiment includes the computer-readable instructions 120 of one or more user applications 122 (e.g., technology applications such as operating system applications, device applications, third party applications, browser applications, network applications, and the like) that facilitate performance of one or more activities associated with the entity. In some embodiments, the first device application of the one or more user applications 122 refers to an application stored on the user device that is configured to receive user instructions/input via an associated first user interface, and in accordance with the user input perform one or more tasks or activities and associated steps (e.g., requesting information, retrieving/receiving information, perform searches, query other applications/ servers, and/or the like) whose data flow through the network is desired to be evaluated in real-time or near real-time. For example, the first technology application may be structured to perform a first type of network activity (e.g., Website front end activities, entity logic middleware activities, server-less activities, Queueing activities, Caching activities, Database activities, DNS, Proxy, Firewall and other activities) associated with the entity.

As discussed, in some embodiments, the user device 104 may refer to multiple user devices that may be configured to communicate with the network monitoring system 105 via the network 101. In some embodiment, the network monitoring system 105, the processing system and/or the network nodes 180 may transmit control signals to the user device, configured to cause the technology application 122 to perform one or more functions or steps associated with testing data transmission characteristics of the entity communication network and evaluating data flows associated in individual applications, in real-time or near real-time.

As further illustrated in FIG. 1, the network monitoring system 105 (also referred to as the system 105) generally comprises a communication device 166, at least one processing device 168, and a memory device 170. As used herein, the term "processing device" or "processor" (e.g., processing devices 114, 138, 168 and 148) generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 168 is operatively coupled to the communication device 166 and the memory device 170. The processing device 168 uses the communication device 166 to communicate with the network 101 and other devices on the network 101, such as, but not limited to the processing system 106, the user system 104 and the network nodes 180. As such, the communication device 166 (and/or communication devices 112, 136, and 146) generally comprises a modem, server, or other device for communicating with other devices on the network 101.

As further illustrated in FIG. 1, the network monitoring system 105 comprises computer-readable instructions 172 stored in the memory device 170, which in one embodiment includes the computer-readable instructions 172 of a network monitoring application 174 (also referred to as a system application), typically structured and configured by the processing system 106. In some embodiments, the memory device 170 includes data storage 171 (not illustrated) for storing data related to the system environment, but not limited to data created and/or used by the network monitoring application 174. In some embodiments, the network monitoring application 174 is configured for testing data transmission characteristics of the entity communication network and evaluating data flows associated in individual applications, in real-time or near real-time, by the processing system application 144 of the processing system 106. Specifically, executing computer readable instructions of 172 of the network monitoring application 174 is configured to cause processing device 168 to transmit certain control instructions to the one or more network nodes to cause their respective processing devices to carry out one or more steps described herein. The network monitoring system 105 may communicate with the processing/control system 106, the user device 104, the network nodes 180, merchant systems and other third party systems (not illustrated) to perform one or more steps described herein, and/or cause these systems to perform one or more of these steps, at least in part.

In some embodiments, the network monitoring application 174 may control the functioning of the user device 104 and/or other network nodes 180. In some embodiments, the network monitoring application 174 comprises computer readable instructions 172 or computer-readable program code 172, the when executed by the processing device 168, causes the processing device to perform one or more steps involved in dynamic latency reduction through edge computation and/or to transmit control instructions to other systems and devices to cause the systems and devices to perform specific tasks. In some embodiments, the network monitoring system 105 and the processing system 106 may be embodied in the same system, or alternatively, the network monitoring system 105 and the processing system 106 may be separate systems as illustrated by FIG. 1.

Moreover, as illustrated in FIG. 1, the processing system 106 or control system 106 (also referred to as a entity system or a financial institution system 106) is connected to the network monitoring system 105 and the network nodes 180 and is associated with an entity network, and is an overarching system that is structured to configure the network monitoring application 174 for converting the network monitoring system 105 into a dedicated workstation. In this way, while only one processing system 106 is illustrated in FIG. 1, it is understood that multiple network systems may make up the system environment 100. The processing system 106 generally comprises a communication device 136, a processing device 138, and a memory device 140. The processing system 106 comprises computer-readable instructions 142 stored in the memory device 140, which in one embodiment includes the computer-readable instructions 142 of a processing system application 144. These devices are similar in structure and functions as those described above. The processing system 106 may communicate with an authentication system 107 (not illustrated) to provide authentication credentials for user activities.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A illustrates an entity communication network environment 200A, in accordance with one embodiment of the present invention. Here, FIG. 2A depicts a non-limiting illustrative example of an entity communication network environment 200A. As discussed, in some embodiments, the network monitoring system 105 and the plurality of network nodes 180, together with the processing system 106 and/or one or more of the user devices 104, constitute the entity communication network 200A, each forming a network node of the entity communication network 200A. That said, in other embodiments, it is envisaged that the entity communication network 200A comprises the plurality of network nodes 180 which interact with the network monitoring system 105, the processing system 106 and/or one or more of the user devices 104 that are external to the entity communication network 200A. Typically, the network nodes (e.g., the network nodes 180, the network monitoring system 105, the processing system 106, and/or the user device(s) 104) of the entity communication network 200A comprise operative communication channels for communicating with each other, in accordance with the network architecture of the entity communication network. In some embodiments, the entity communication network 200A has network nodes comprising physical nodes/devices and/or virtual nodes such as software (e.g., for routing, switching and other data flow operations), such that at least a portion of the network 200A is virtualized with software. In some embodiments, the entity communication network 200A comprises a cloud computing network.

As illustrated by FIG. 2A, the entity communication network 200A comprises a plurality of nodes (e.g., 205 to 266). Some or all of the nodes 205-266 described herein may refer to the plurality of nodes 180. Moreover, the entity communication network 200A is typically in communication with an external communication network, such as the internet 310 or another network 310 (e.g., an ISP network). The entity communication network 200A comprises a network security node 205, such as a firewall 205, that monitors and controls incoming and outgoing network traffic based on predetermined security rules. The network security node may be in operative communication with one or more network nodes 210 structured for modulating one or more carrier wave signals to encode digital information for transmission and demodulating signals to decode the transmitted information, such as modem(s) 210. The entity communication network 200A further comprises one or more network nodes 215 that are configured for traffic routing and data packet forwarding, such as router(s) 215. The router node 215 may be in operative communication with other network nodes such as, access point node(s) 230 (e.g., wireless access point 230), proxy servers, switches (240, 250), server systems 220 (e.g., processing system 106, network monitoring system 105, etc.), and the like. The wireless access point 230, typically is a networking hardware device that allows Wi-Fi or NFC compatible data terminal equipment devices (DTEs) or computing devices 236a-236c (e.g., user devices 104 such as computers, smartphones, PDAs, smart devices, etc.) to connect to a wired network. The server systems 220 (e.g., processing system 106, network monitoring system 105, etc.) may be in operative communication with database systems or database server nodes 222.

The network switch nodes (240, 250) (also called switching hubs, bridging hubs, or MAC bridges) are computer network devices/nodes that connect other devices/nodes of the network together, by using packet switching to receive, process and forward data to a destination device/node. In some embodiments, the network switch nodes (240, 250) are multiport network bridges that use unique network hardware addresses (e.g., MAC addresses of the devices/nodes such as the data terminal equipment devices) to process and forward data at a data link layer (described later on) of the entity communication network 200A. In some embodiments, the network switch nodes (240, 250) are multilayer switches that also process data at a network layer by additionally incorporating routing functionality. As illustrated by FIG. 2A, the network switch 240 may connect other data terminal equipment (DTEs) devices/nodes such as server devices 242 (e.g., processing system 106, Network monitoring system 105 etc.) and a hub 244 which in turn connects nodes such as 246a-246d (e.g., processing system 106, Network monitoring system 105, user devices 104, other DTEs etc.). The hub 244 may be an Ethernet hub, active hub, network hub, repeater hub, multiport repeater or another network switch. The network switch 250 may connect network nodes such as a server 256a, a proxy server 256b, a computing device 256c, etc. The computing device 256c may in turn be operatively connected to other nodes such as a printer terminal 258 and a network bridge 260. The network bridge 260 is a computer networking device that creates a single aggregate network from multiple communication networks or network segments, such as the nodes 266a-b (e.g., computing devices or other DTEs) and the node 266c (e.g., a server or other DTEs), as illustrated. The entity communication network 200A may further comprise one or more load balancers (not illustrated).

As such, the entity communication network 200A comprises a plurality of nodes such as one or more of: one or more modems, one or more hubs, one or more switches, one or more routers, one or more load balancers, and one or more data terminal equipment devices, cloud service virtual machines, VPN Gateways, traffic manager nodes, SQL servers, etc., as desired, in any suitable configuration and arrangement. The DTEs typically comprise unique network addresses (e.g., hardware addresses such as media access control (MAC) addresses, network addresses such as internet protocol (IP) addresses), such as server devices, proxy servers, one or more computing devices, one or more data output devices, and/or one or more network hosts. Moreover, in some embodiments, the network nodes and connections/communication channels between the nodes may change, due to expansion, modification or maintenance of the networks. The system (e.g., the processing/control system 106) is configured to identify the current configuration of the entity communication network 200A's network architecture, i.e., the plurality of network nodes of the entity communication network and their communication channels and protocols.

In some embodiments, determining the network architecture of the entity communication network by the processing/control system 106 further comprises identifying data communication links between the plurality of nodes and unique network addresses (e.g., hardware addresses such as media access control (MAC) addresses, network addresses such as internet protocol (IP) addresses) of the plurality of network nodes required/utilized for operative communication using the data communication links. Here, in some embodiments, the processing/control system 106 is structured to identify a physical layer, a data link layer, a network layer, a transport layer, a session layer, a presentation layer and/or an application layer of the network architecture.

The physical layer is typically associated with transfer of bits between two network nodes involving nodes such as repeaters, hubs, modems, fiber media converters and the like. The physical layer defines the electrical and physical specifications of the data connection and defines the relationship between a device and a physical transmission medium (for example, an electrical cable, an optical fiber cable, or a radio frequency link). This includes the layout of pins, voltages, line impedance, cable specifications, signal timing and similar characteristics for connected devices and frequency (5 GHz or 2.4 GHz etc.) for wireless devices. It is responsible for transmission and reception of unstructured raw data in a physical medium. As such, identifying the physical layer of the network architecture by the control system 106 typically involves determining the above listed components of the physical layer along with networking hardware transmission protocols for transmission of bit streams physical links of the data communication links between the plurality of nodes.

The data link layer typically involves interfacing with the physical layer by providing node-to-node transfer (e.g., a link between two directly connected nodes) and involves network nodes such as network switches, network interface cards (NICs), etc., based on physical addressing schemes (e.g., MAC addresses). The data link layer is also configured for detection and correction of errors in the physical layer and defines protocols for establishing and terminating a connection between two physically connected nodes/devices and protocols governing data flow control between them, such as Point-to-Point Protocol (PPP), Media access control (MAC) layer protocols for data transmission permissions/access and flow control and Logical link control (LLC) layer protocols for encapsulating network layer protocols and frame synchronization. Identifying the data link layer of the network architecture by the control system 106, typically involves determining the foregoing and the networking transmission protocols for frame synchronization, logical link control and media access control associated with the data communication links between the plurality of nodes. In this regard, the control system 106 typically identifies media access control (MAC) addresses of at least a portion of the plurality of nodes (e.g., for some or all of the network nodes that contain MAC addresses).

The network layer typically is associated with data packet delivery from end (e.g., source node) to end (intermediate or destination node) by utilizing a logical network addressing scheme such as Internet Protocol (IP) addresses, involving nodes such as routers. As such, the network layer provides the functional and procedural means of transferring variable length data sequences (called datagrams) from one node to another. The network layer is structured to deliver the message to the destination node, possibly routing it through intermediate nodes. If the message is too large to be transmitted from one node to another on the data link layer between those nodes, the network layer may implement message delivery by splitting the message into several fragments (multiple data packets) at one node, sending the fragments independently, and reassembling the fragments at another node. Identifying the network layer of the network architecture by the control system 106 typically involves identifying data packet forwarding and routing protocols associated with the data communication links between the plurality of nodes and identifying internet protocol (IP) addresses of at least a portion of the plurality of nodes.

Moreover, the transport layer provides the functional and procedural means of transferring variable-length data sequences from a source to a destination host via one or more networks, while maintaining the quality of service functions, using a transport-layer protocol such as a Transmission Control Protocol (TCP) or a User Datagram Protocol (UDP). Identifying the transport layer of the network architecture typically involves determining host-to-host communication protocols for technology applications associated with at least a portion of the plurality of nodes. The session layer is associated with establishing, managing and terminating the connections between the local and remote applications. The presentation layer establishes context between application-layer entities, in which the application-layer entities may use different syntax and semantics if the presentation service provides a mapping between them. The application layer interacts with the technology applications (software) that implement a communicating component, including identifying communication partners, determining resource availability, and synchronizing communication.

FIG. 2B illustrates an entity communication network environment 200B, in accordance with one embodiment of the present invention. Here, FIG. 2B depicts a non-limiting illustrative example of an entity communication network environment 200B. As discussed, in some embodiments, the network monitoring system 105 and the plurality of network nodes 180, together with the processing system 106 and/or one or more of the user devices 104, constitute the entity communication network 200B, each forming a network node of the entity communication network 200B. That said, in other embodiments, it is envisaged that the entity communication network 200B comprises the plurality of network nodes 180 which interact with the network monitoring system 105, the processing system 106 and/or one or more of the user devices 104 that are external to the entity communication network 200B. Typically, the network nodes (e.g., the network nodes 180, the network monitoring system 105, the processing system 106, and/or the user device(s) 104) of the entity communication network 200B comprise operative communication channels for communicating with each other, in accordance with the network architecture of the entity communication network. In some embodiments, the entity communication network 200B has network nodes comprising physical nodes/devices and/or virtual nodes such as software (e.g., for routing, switching and other data flow operations), such that at least a portion of the network 200B is virtualized with software. In some embodiments, the entity communication network 200B comprises a cloud computing network.

As illustrated by FIG. 2B, the entity communication network 200B (e.g., a global network, private network, etc.) comprises a plurality of nodes (e.g., 270, 271A-271N, 272A-272N, 281A-281N, and/or 282A-282N). Some or all of the nodes (e.g., 270, 271A-271N, 272A-272N, 281A-281N, and/or 282A-282N) described herein may refer to the plurality of nodes 180 and/or nodes 205 to 266 illustrated in FIG. 2A. Moreover, the entity communication network 200B is typically in communication with an external communication network, such as the internet or another network (e.g., an ISP network). The entity communication network 200B comprises a predetermined topology, architecture, and hierarchy. The entity communication network 200B may comprise a bus layout, a star layout, a ring layout, a mesh layout, a tree layout, a hybrid layout, an overlay network layout, and/or a suitable combination of any of the foregoing.

As illustrated by FIG. 2B, the communication network 200B may comprise a multi-tiered arrangement of the plurality of nodes (e.g., 270, 271A-271N, 272A-272N, 281A-281N, and/or 282A-282N). In this regard, FIG. 2B illustrates a central system 270 (also referred to as a central server system 270), e.g., a cloud server, associated with a first tier. The central system 270 is in operative communication with a nodes 271A, 271B, 271C, . . . , 271N and/or the like associated with a second tier. The nodes of the second tier maybe in operative communication with nodes of a third tier. For instance, as illustrated, node 271A is in operative communication with node 272A, node 272B, and/or the like of a third tier, node 271B is in operative communication with node 272C, and/or the like of a third tier, . . . , and/or node 271N is in operative communication with node 272D, node 272E, . . . , node 272N and/or the like of a third tier. The nodes of the third tier maybe in operative communication with nodes of a fourth tier. For instance, as illustrated, node 272B is in operative communication with nodes system 281A, . . . , system 281N, and/or the like of a fourth tier, . . . , and/or node 272D is in operative communication with nodes system 282A, system 282B, system 282C, . . . , system 282N and/or the like of a fourth tier. Although four tiers are depicted in FIG. 2B for illustrative purposes, it is understood that the communication network 200B may comprise more or fewer tiers.

Here, the communication network 200B may comprise "edges" or "edge clusters" or "edge portions", that are typically closer to the sources of data. Each edge cluster may comprise one or more network device groups and the component systems thereof. As an illustrative example, FIG. 2B depicts a first edge cluster 280A having nodes systems 281A, . . . , and/or system 281N, . . . , and/or Nth edge cluster 280N having nodes system 282A, system 282B, system 282C, . . . , and/or system 282N. In some embodiments, the components of an edge cluster may be associated with a WAN or LAN.

As discussed previously, with existing technology, application/system monitoring may be performed, if at all, only via a central system, such as a central system 270. The deficiencies or problems arising from the foregoing in conventional/existing systems are fivefold, and will be described with respect to FIG. 2B. First, assuming the central system is able to detect issue events, all the data from all of the nodes (271A-271N, 272A-272N, 281A-281N, and/or 282A-282N) of the various tiers is required to be analyzed by the central system 270 at all times, to even determine that an issue exists somewhere in the network. As such, central system 270 of conventional/existing systems is required to process immense amounts of data, which while requiring large amounts of processing resources at the central system 270, is also extremely time intensive. Here, by the time that the central system 270 eventually ascertains that an issue existing at a particular node, the issue may have already triggered undesirable and adverse effects. Second, assuming the central system is able to detect and remediate an issue at a system at an edge cluster such as system 282B, data from system 282B needs to be transmitted to node 272D, which in turn needs to be transmitted from node 272D to node 271N, and which further in turn needs to be transmitted from node 271N to the central system 270, undesirably requiring a large about of time and processing and communication resources for the data from system 282B to be transmitted to the central system 270 via various intermediate systems. The central system 270 would then have to process this data and determine that an issue exists at the system 282B, and further formulate a fix/remediation for the issue. This determined remediation would need to be transmitted from the central system 270 to the node 271N, from the node 271N to the node 272D, and finally from the node 272D to system 282B, undesirably requiring a large about of time and processing and communication resources for the data from central system 270 to be transmitted to the system 282B via various intermediate systems. Accordingly, this causes an undesirably high latency in both issue detection and issue remediation, due to the time lag and delays in data transmission through the intermediate nodes/systems. Third, if a similar issue later occurs at system 282N of the same edge cluster 280N, in conventional systems the two-way data transmission process would need to be repeated. In other words, data from system 282N needs to be transmitted to the central system 270, via intermediary nodes 272D and node 271N, undesirably requiring a large about of time and processing and communication resources. The central system 270 would then have to process this data and determine that a similar issue exists at the system 282N, and transmit the required remediation to the node 271N, via the intermediary nodes, again undesirably requiring a large about of time and processing and communication resources. Accordingly, this causes an undesirably high latency in both issue detection and issue remediation, even for remediating previously remediated issues in the same edge cluster. The afore described latency, required processing resources, and time, exponentially increases as the complexity of the communication network 200B, its number of applications and devices, and/or the like increases.

Fourth, while having an undesirably high latency of resolution of issues/errors in the network and large implementation times for resolutions to alleviate the issues/errors, the central system based monitoring of conventional systems may be ineffective in complex networks with a large number of applications and devices. Here, by the time that the central system eventually ascertains that an issue existing at a particular node, the issue may have already triggered undesirable and adverse effects. Fifth, conventional systems lack the ability for intelligent correlation of issues and cross-pollination of resolutions between disparate parts of the network architecture. For instance, conventional systems are typically not capable of intelligent correlation of issues between a system 281A of an edge cluster 280A with that of system 282C of another edge cluster 282C.

The present invention provides a solution to the foregoing problems and drawbacks and provides other advantages by providing dynamic latency reduction through edge computation based on a multi-layered mechanism. The invention is structured for proactive de-centralized monitoring and resolution of network issue events and cross-pollination of resolutions of network issue events between network components and dynamic reallocation of technology resources therebetween for load balancing. In this regard, the present invention provides an edge node (also referred to as a fog node) for providing dynamic latency reduction at each edge cluster of the entity communication network 200B. As indicated by FIG. 2B, the present invention provides an edge node 290A for the edge cluster 280A, . . . , and/or an edge node 290N for the edge cluster 280N. This drastically reduces the data transmission and processing resources and effectively eliminates the latency and lag due to the intermediary nodes, while still allowing for intelligent correlation of issues and cross-pollination of resolutions between disparate parts of the network architecture. In typical implementation of the present invention, the latency of the resolution, i.e., the time lag or duration for identification and/or remediation of an issue, is negligible or near negligible. Moreover, the edge nodes may be implemented in networks of any complexity.

In some embodiments, the present invention, there maybe three layers of computation and resolution mechanism to reduce the latency comprising (i) micro edge adaptors (also referred to as "micro-edge adaptors") provided at each component/device (e.g., systems 281A, 281N, 282A, 282B, 282C, 282N, etc.) of an edge cluster, (ii) edge nodes (e.g., 290A, 290N, etc.) for each edge cluster, and (iii) central server system (e.g., central system 270).

At a layer/tier of the network (e.g., a first layer), in some embodiments, the edge node (also referred to as a fog node) (e.g., 290A, 290N, etc.) is provided one hop or network segment away from the edge cluster of the network, and is used to compute, identify a customized optimal resolution. The edge node (also referred to as a fog node) typically has the intelligence to aggregate and analyze the issues and vectorize the issue-resolution based on application, type of issue, event, time, and/or the like. In some embodiments, these vectors are aggregated or grouped based on the inherent pattern (e.g., through Artificial intelligence). In some instances, resolution instructions are decoded from the relevant vector for any issue based on the likeness. These vectors are analyzed for right resolution instructions based current system conditions, prioritization, dependency, and/or the like. In some instances, if the resolution previously required a time greater than a redetermined threshold in the past, the edge node (e.g., via its incrementor component) may look for a temporary alternate system to process/compute the activity till the resolution instructions are complete. Also, in some embodiments, the edge node (e.g., based on the inputs from a resource analysis component) may transmit efficiency/load distribution instructions to the respective systems/applications.

At another layer/tier of the network (e.g., a second layer), in some embodiments, the system provides a central server system which is structured to collect all the vectors from every edge node and to aggregate the same to determine global issue-resolution patterns in cloud vector store. In some embodiments, these global issue-resolution patterns are then synchronized to all edge nodes on periodic basis, so that the edge node computation efficiency is increased without compromising the latency. Any new vectors are extracted from edge nodes for further analysis and reinforcement learning, helping in benchmarking best practices.

At yet another layer/tier of the network (e.g., a third layer), micro edge adaptors are provided at component devices of the edge cluster. The micro edge adaptors are local adaptors which are structured to read and process the vector instructions, and implement the instructions based on the initial configuration. Typically, the micro edge adaptor comprises a local vector cache to implement any repeatable issues of the system, and then share the issue and the autonomous activity to the edge node for processing or syncing. In this way the present invention alleviates the deficiencies of conventional systems and provides several improvements and advantages.

Referring now to FIG. 3, a schematic block diagram and process flow depiction 300 of an entity communication network is provided for dynamic latency reduction through edge computation based on a multi-layered mechanism, in accordance with some embodiments of the invention. As illustrated, the entity communication network 390 typically comprises a tiered, multi layered hierarchical architecture. In this regard, the entity communication network 390 may be substantially similar to the networks 200A-200B described with respect to FIGS. 2A-2B. It is noted that the terms "first", "second", "third", and so on as used herein typically do not indicate any particular order, sequence, classification and/or the like, unless otherwise specified.

At a first layer of the entity communication network 390, the entity communication network 390 typically comprises edge clusters A1, B1, . . . , and/or N1. In some embodiments, the edge cluster A1 maybe in the form of a plurality of network device groups 310 associated with a first layer of the entity communication network 390. Here, each network device group (e.g., network device group 310*a*, 310*b*, . . . , and/or 310*n*) of the plurality of network device groups 310 is at the edge level and comprises a plurality of component systems 311 (e.g., similar to the nodes described with respect to FIGS. 2A-2B). As illustrated by FIG. 3, a first network device group 310*a* may comprise component systems system A 312*a*, system B 314*a*, . . . , and/or system N 316*a*. Similarly, a second network device group 310*b* may comprise component systems system A 312*b*, system B 314*b*, . . . , and/or system N 316*b*, . . . , and/or an Nth network device group 310*n* may comprise component system A 312*n* etc. For instance, the first network device group 310*a* comprising component systems system A 312*a*, system B 314*a*, . . . , and/or system N 316*a*, the second network device group 310*b* comprising component systems system A 312*b*, system B 314*b*, . . . , and/or system N 316*b*, . . . , and/or the Nth network device group 310*n* comprising component system A 312*n*, may form a first edge cluster A1. In other words, components/devices of an edge cluster may be grouped into network device groups. In some instances, components/devices in a network device group may be associated with a LAN or WAN. As a non-limiting example, the first edge cluster A1 maybe substantially similar to the edge clusters (280A, 280N, etc.) described previously with respect to FIG. 2B.

The other edge clusters B1, N1, maybe substantially similar to the first edge cluster A1. For instance, the edge cluster B1 may comprise one or more network device groups and the component systems thereof, which may be substantially similar to those described with respect to device groups (310*a*, 310*b*, . . . , and/or 310*n*). Similarly, an Nth edge cluster N1 may comprise one or more network device groups and the component systems thereof, which may be substantially similar to those described with respect to device groups (310*a*, 310*b*, . . . , and/or 310*n*).

Typically, each component system 311 of the plurality of component systems 311 is in operative communication with an associated micro edge adaptor 302. For instance, as illustrated by FIG. 3, for the first network device group 310*a*, system A 312*a* may be associated with a micro edge adaptor 302*a*, system B 314*a* may be associated with a micro edge adaptor 302*b*, . . . , and/or system N 316*a* may be associated with a micro edge adaptor 302*c*. Similarly, for the second network device group 310*b*, system A 312*b* may be associated with a micro edge adaptor 302*d*, system B 314*b* may be associated with a micro edge adaptor 302*e*, . . . , and/or system N 316*b* may be associated with a micro edge adaptor 302*f*. For the Nth network device group 310*n*, system A 312*n* may be associated with a micro edge adaptor 302*g*. Although not illustrated, component systems of the other edge clusters B1, N1, maybe may further comprise respective micro edge adaptors 302, similar to those of the first edge cluster A1.

In other words, the micro edge adaptors 302 are provided at component devices of the edge clusters. The micro edge adaptors are structured to (i) read all parameters of the respective component system/device (e.g., CPU usage, resource utilization levels, data flow, and/or the like), and (ii) pass customized adapted instructions to the respective component system/device based on the type of technology, such as operating system (e.g., Linux, etc.), application technology (e.g., Java, Oracle, etc.), and/or the like, and convert, transmit, and implement instructions accordingly. Typically, the micro edge adaptors are local adaptors which are structured to read and process the vector instructions, and implement the instructions based on the initial configuration. Typically, each of the micro edge adaptors 302 are structured to store one or more frequent resolution vectors at the micro edge adaptors 302 for implementation at the associated component system 311. Typically, the micro edge adaptor comprises a local vector cache to implement any repeatable issues of the system, and then share the issue and the autonomous activity to the edge node for processing or syncing. Moreover, each of the micro edge adaptors 302 are structured to transform the one or more solution instruction actions of the resolution vectors into a technology formats compatible with the associated component system 311, and subsequently transmit the transformed one or more solution instruction actions to the associated component system 311. Moreover, the micro edge adaptors 302 are structured to implement the one or more solution instruction actions of the resolution vectors at the associated component system.

At a second layer of the entity communication network 390, the entity communication network 390 typically comprises one or more edge nodes 320 (similar to the edge nodes 290A, 290N described with respect to FIG. 2B previously), each edge node being provided for a respective edge cluster. In some embodiments, the edge node 320 (also referred to as a fog node) is provided one hop or network segment away from the edge cluster of the network, and is used to compute and identify a customized optimal resolution. Here, typically, each edge node (320a, 320b, . . . , 320n) of the one or more edge nodes 320 is in operative communication with at least one of the plurality of network device groups 310 of the respective edge cluster, e.g., directly and/or via the associated micro edge adaptors 302. For instance, as illustrated by FIG. 3, a first edge node 320a may be in operative communication with the first network device group 310a and the component systems thereof (312a, 314a, . . . , and/or 316a), the second network device group 310b and the component systems thereof (312b, 314b, and/or 316b), . . . , and/or the Nth network device group 310n and the component system(s) thereof (312n, etc.). Similarly, a second edge node 320b may be in operative communication with one or more network device groups of the edge cluster B1 and the component systems thereof, which may be substantially similar to those described with respect to device groups (310a, 310b, . . . , and/or 310n). Similarly, an Nth edge node 320n may be in operative communication with one or more network device groups of the edge cluster N1 and the component systems thereof, which may be substantially similar to those described with respect to device groups (310a, 310b, . . . , and/or 310n).

Although the invention is discussed with respect to the first edge node 320a, it is understood that the second edge node 320b, . . . , and/or the Nth edge node 320n may be substantially similar in structure and operation to the first edge node 320a. Typically, each edge node 320 may comprise a instant resolver component 322, a data collector component 324, an edge log store 326, an AI analyzer aggregator component 328, a resolution pattern store 330, a resolution checker component 332, a resource analysis component 334, a proactive efficiency incrementor component 336, an edge adaptor component 338, a cloud synchronization component 340 and/or a resource data store 342.

The data collector component 324 is typically structured to retrieve application logs associated with the plurality of component systems 311 of a first network device group 310a of the plurality of network device groups 310. The edge log store 326 is typically structured to store the application logs at an edge log store 326 of the first edge node 320a.

The AI analyzer aggregator component 328 is typically structured to analyze the application logs and aggregate the application logs to determine a first pattern associated with a first network issue event associated with the first network device group 310a. The AI analyzer aggregator component 328 typically has the intelligence to aggregate and analyze the issues and vectorize the issue resolution based on application, type of issue, event, time, and/or the like. In some embodiments, these vectors are aggregated or grouped based on the inherent pattern (e.g., through Artificial intelligence (AI)). The resolution pattern store 330 is typically structured to correlate the first pattern associated with the first network issue event with a plurality of resolution actions. Here, the AI analyzer aggregator component 328 and/or the resolution pattern store 330 may transform the application logs into one or more event vectors. Typically, the one or more event vectors comprise a plurality of event parameters associated with the first network issue event. Moreover, the AI analyzer aggregator component 328 and/or the resolution pattern store 330 may transform the plurality of resolution actions into one or more resolution vectors. Here, the one or more resolution vectors comprise a plurality of resolution parameters. In some instances, resolution instructions are decoded from the relevant vector for any issue based on the likeness.

The resolution checker component 332 is typically structured to determine a first resolution vector of the plurality of resolution vectors based on identifying a match between at least a portion of the one or more event vectors and the first resolution vector. Here, the resolution checker component 332 works in conjunction with the resource analysis component 334. Typically, the resource analysis component 334 further comprises a prioritizer application 334a structured for constructing a priority parameter, an utilization tracker application 334b structured for constructing a resource utilization parameter, a dependency tracker application 334c structured for constructing a dependency parameter, a real-time condition application 334d structured for constructing a real-time condition parameter, and an event tracker application 334e structured for constructing a past event parameter associated with network device group(s) 310, and store the same at the resource data store 342. In some embodiments, determining the first resolution vector by the resolution checker component 332 further comprises determining that the first resolution vector is compatible with the priority parameter, the resource utilization parameter, the dependency parameter, the real-time condition parameter, and/or the past event parameter associated with network device group(s) 310. These vectors are analyzed for right resolution instructions based current system conditions, prioritization, dependency, and/or the like.

The instant resolver component 322 is typically structured to transform the first resolution vector into one or more solution instruction actions. The resolution checker component 332 is further structured to transmit the one or more solution instruction actions of the first resolution vector to a first micro edge adaptor (e.g., micro edge adaptor 302b) of a first component system (e.g., system B 314a) of the first network device group 310a associated with the first network issue event. The instant resolver component 322 may cause the micro edge adaptor 302 to implement the one or more solution instruction actions of the first resolution vector at the first component system (e.g., system B 314a) of the first network device group 310a.

The proactive efficiency incrementor component 336 is typically structured to determine one or more auxiliary preventative instruction actions associated with the first network issue event. The proactive efficiency incrementor component 336 may then transmit the one or more auxiliary preventative instruction actions to the first micro edge adaptor (e.g., micro edge adaptor 302b) of the first component system (e.g., system B 314a) of the first network device group 310a, and subsequently implement auxiliary preventative instruction actions at the first component system of the first network device group 310a. In some instances, if the resolution previously required a time greater than a redetermined threshold in the past, the edge node (e.g., via its incrementor component 336) may look for a temporary alternate system to process/compute the activity till the resolution instructions are complete.

The edge adaptor component 338 is typically structured to determine current resource parameters of the plurality of network device groups 310, and transmit custom load-balancing instructions to the plurality of network device groups 310 in response to determining a resource imbalance at the plurality of network device groups 310. The cloud synchronization component 340 is typically structured to synchronize, e.g., periodically, the network issue events with an edge listener component 352 of the central server system 350. In some embodiments, the edge node (e.g., based on the inputs from a resource analysis component) may transmit efficiency/load distribution instructions to the respective systems/applications.

In some embodiments, the entity communication network 390 further comprises a workflow component 344. The workflow component 344 may determine a match between a second application log of the plurality of application logs and a prior application log associated with a prior network issue event. In response to determining that match, the workflow component 344 may determine that the second application log is associated with a current network issue event. The workflow component 344 may further categorize the current network issue event into an issue category based on one or more event parameters. Subsequently, the workflow component 344 may determine one or more resolution actions for the current network issue event based on at least a prior resolution action associated with the prior network issue event.

At a third layer of the entity communication network 390, the entity communication network 390 typically comprises a central server system 350. The central server system 350 is typically in operative communication with the one or more edge nodes 320. Here, the first edge node 320a may analyze the application logs to determine a second pattern associated with a second network issue event associated with the first network device group 310a. Here, the first edge node 320a may transform the application logs into one or more second event vectors. Typically, the one or more second event vectors comprise a plurality of event parameters associated with the second network issue event. The first edge node 320a may further determine that correlation of the one or more second event vectors is unsuccessful. In response to unsuccessful correlation, the first edge node 320a may transmit the one or more second event vectors to the central server system 350. The central AI analyzer component 356 of the central server system 350 may analyze the one or more second event vectors. Subsequently, the central AI analyzer component 356 of the central server system 350 may determine one or more second resolution actions for the one or more second event vectors in conjunction with the cloud vector store 354.

In some embodiments, the edge listener component 352 is structured to collect all the vectors from every edge node and to aggregate the same to determine global issue-resolution patterns in cloud vector store 354. In some embodiments, these global issue-resolution patterns are then synchronized to all edge nodes on periodic basis, so that the edge node computation efficiency is increased without compromising the latency. Any new vectors are extracted from edge nodes for further analysis and reinforcement learning at the central AI analyzer component 356, helping in benchmarking best practices.

FIGS. 4A and 4B illustrate a high level process flow 400A-400B for dynamic latency reduction through edge computation based on a multi-layered mechanism, in accordance with some embodiments of the invention. In particular, the high level process flow is structured for proactive de-centralized monitoring and resolution of network issue events and cross-pollination of resolutions of network issue events between network components and dynamic reallocation of technology resources therebetween for load balancing. These steps are typically performed by processor 138 (also referred to as the first processor) of the control system 106 based on executing computer readable/executable instructions/code of the processing system/control application 144. FIGS. 4C-4D illustrate high level schematic representations 400C-400D of resolution vector matching, in accordance with some embodiment of the invention. Specifically, FIGS. 4C-4D depict a line and symbol diagram representations of some of the data structures that may be constructed by the system and or that may exist within the multidimensional databases, in accordance with some embodiments of the present invention. FIGS. 4C-4D illustrate non-limiting examples of the data transformations performed by the invention. The steps of high level process flow 400A-400B are discussed in conjunction with FIGS. 4C-4D below.

First at block 402, the system may retrieve, via the data collector component 324 of the first edge node 320a, application logs (e.g., first application logs) associated with the plurality of component systems 311 of a first network device group 310a of the plurality of network device groups 310. In some embodiments, the application logs comprise system and application logs and other data associated with the component systems. In some embodiments, the application logs may be collected via the respective configured micro-edge adaptors. Here, the system may further store the application logs at an edge log store 326 of the first edge node 320a, via the edge log store 326.

The system may then analyze the application logs, via the AI analyzer aggregator component 328 of the first edge node 320a to determine whether a network issue event exists in any component system of the first network device group. Here, the AI analyzer aggregator component 328 may analyze parameters of application logs such as the resource status, type of event, time of occurrence of the event, originating components/parts/application, affected components/parts/application, and/or the like. Here, the system via the AI analyzer aggregator component 328 may aggregate the application logs and analyze them to determine a first pattern associated with a first network issue event associated with the first network device group 310a and its resolution correlation, as indicated by block 404. The system, via the AI analyzer aggregator component 328, may determine that the first pattern indicates that the first network device group is associated with a first network issue event. In some embodiments, the system may determine a match between the first application logs and a prior application log associated with a prior network issue event, and in response to determining the match, determine that the first network device group is associated with the first network issue event. In other words, the system via the first edge node, determines a first network issue event associated with a first component system of the first network device group based on analyzing the first application logs.

At block 406, the system, via the AI analyzer aggregator component 328 and/or the resolution pattern store 330, may correlate the first pattern associated with the first network issue event with a plurality of resolution actions. In this regard, the system may determine the plurality of resolution actions of a global set of resolution actions that most closely match or that are applicable to the parameters of the determined first pattern such as the resource status, type of event, time of occurrence of the event, originating components/parts/application, affected components/parts/application, and/or the like.

Moreover, the system, via the AI analyzer aggregator component 328 and/or the resolution pattern store 330, may transform the application logs into one or more event vectors, as indicated by block 408. The one or more event vectors comprise a plurality of event parameters associated with the first network issue event. Here, the system may first determine one or more event parameters associated with the first network issue event such as event type, severity index, affected technology/components, resource utilization, a resource condition, duration, time of accordance, frequency, and/or the like. The system may then assign a weight attribute to each of the event parameter, such that the weight attribute is a standardized, graded measure of the magnitude of the one or more event parameters. The system may then construct a first event vector 420 comprising the (i) one or more event parameters 424a and (ii) the associated weight attributes 426a (illustrated by FIG. 4C).

At block 410, the system, via the AI analyzer aggregator component 328 and/or the resolution pattern store 330, may transform the plurality of resolution actions into one or more resolution vectors. Here, the one or more resolution vectors comprise a plurality of resolution parameters. The system may determine data associated with plurality of resolution actions. The system may further determine the associated issue event that required the resolution and further determine the associated event parameters (similar to those described previously). The system may utilize the foregoing to construct one or more resolution parameters for each of the resolution actions. Typically, the plurality of resolution parameters comprise (i) data associated with plurality of resolution actions, and (ii) one or more prior event parameters of the associated prior network issue event. The system may then assign a weight attribute to each of the resolution parameter, such that the weight attribute is a standardized, graded measure of the magnitude of the one or more resolution parameters and is compatible with correlation with the weight parameters of the event parameters described previously. The system may then construct a resolution vector 510 comprising the (i) one or more resolution parameters 514 and (ii) the associated weight attributes 516 (illustrated by FIG. 4C). As illustrated by FIG. 4C, the system may construct "m" number of resolution vectors, a first resolution vector structure 510a having one or more resolution parameters 514a and weight attributes 516a, . . . , a (m−2)th resolution vector structure 510(m−2) having one or more resolution parameters 514(m−2) and weight attributes 516(m−2), a (m−1)th resolution vector structure 510(m−1) having one or more resolution parameters 514(m−1) and weight attributes 516(m−1), and a mth resolution vector structure 510m having one or more resolution parameters 514m and weight attributes 516m.

Next, the system may determine, via the resolution checker component 332 of the first edge node 320a, a first resolution vector of the one or more resolution vectors for the first network issue event based on identifying a match between at least a portion of the first event vector and the first resolution vector, as indicated by block 412. Here, the first resolution vector may be selected out of the plurality of resolution vectors based on similarity index being higher than a predetermined threshold.

Determining a match between at least a portion of the first event vector and the first resolution vector in accordance with some embodiments of the invention will now be described with respect to FIGS. 4C-4D. For the first event vector 420 and each resolution vector structure 510 (510a-510m), the system may associated the same with an n-dimensional vector space 550 in accordance with (i) the corresponding and applicable event parameters 424 and/or resolution parameters 514 and the corresponding (ii) weight parameters (426a, and 516a-516m). Typically, the event parameters 424 and/or resolution parameters 514 function as independent attributes and are each associated with a vector dimension of the n-dimensional vector space. For instance, if the system identifies 9 independent attributes, the n-dimensional vector space has 9 vector dimensions, with "n" being equal to 9. The corresponding weight parameter (426a, and 516a-516m) of the independent attribute (424a, 514a-514m) drives or triggers or provides a magnitude to the independent attribute in its respective vector direction. Typically, the system constructs the first event vector 420 and each resolution vector structure 510 (510a-510m) based on linking, correlating or mathematically assembling (i) the independent attributes (the corresponding and applicable event parameters 424 and/or resolution parameters 514) and the corresponding (ii) weight parameters (426a, and 516a-516m).

The system may the determine a subset 660 of the resolution vector structure 510 that most closely match the first event vector 420, based on the similarity index, i.e., how similar they are, i.e., whose similarity index is within a predetermined threshold. In some embodiments, the similarity index may take the form of Euclidian distance, with the most similar vectors having the smallest distance therebetween. Although there are n-dimensions in the n-dimensional vector space 550 which cannot be represented easily in their entirety on paper, it is noted that FIG. 4C provides a schematic representation of the positioning of the constructed vectors, while FIG. 4D provides its graphical representation in 3-dimensions, for ease of visualization purposes.

After spatially positioning the first event vector 420 and each resolution vector structure 510 (510a-510m) along the independent attribute vectors, the system may then determine spatial distances between the first event vector 420 and each of the resolution vector structures 510 (510a-510m, in the n-dimensional vector space. Here, in some embodiments, the system may determine Euclidean spatial distances. This distance represents how dissimilar the event and the resolution are. A value of zero means they are a perfect match while large distance suggests there are significant differences between the two. The system may then first resolution vector 510a of the one or more resolution vectors for the first network issue event based on determining that the first resolution vector 510a has the minimum distance 610 out of the determined distances (e.g., 612, 614, 616, etc.). The system may then link the first event vector structure 420 with the then first resolution vector 510a of the one or more resolution vectors. It is noted that linking the vector structures, as used herein, refers to, identifying the corresponding data structures, and linking the corresponding data structures, e.g., by inserting pointers at the respective memory location.

In some embodiments, e.g., in addition to the Euclidian distance based similarity index determination, determining the first resolution vector further comprises determining that the first resolution vector is compatible with the network security event. Here, the resource checker component 332 may activate the resource analysis component 334 and trigger the resource analysis component to determine and transmit a priority parameter, a resource utilization parameter, a dependency parameter, a real-time condition parameter, and/or past event parameter associated with the first network device group 310a. Typically, the resource analysis component 334 further comprises various applications structured for determining the foregoing parameters. The resource analysis component 334 comprises a prioritizer application 334a structured for constructing a priority parameter indicating the priority of the first network issue event. The resource analysis component 334 comprises a utilization tracker application 334b structured for constructing a resource utilization parameter indicating the resource utilization levels associated with the first component system and/or other component systems of the first network device group. The resource analysis component 334 comprises a dependency tracker application 334c structured for constructing a dependency parameter indicating other interdependent systems, applications and actions/tasks that would be affected by the first component system and/or the first network issue event. The resource analysis component 334 comprises a real-time condition application 334d structured for constructing a real-time condition parameter indicating the current resource levels, CPU utilization, and/or the like associated with the first component system and/or other component systems of the first network device group. The resource analysis component 334 comprises an event tracker application 334e structured for constructing a past event parameter associated with network device group(s) 310 indicating prior network events associated with the first component system and/or the first network issue event. In other words, determining the first resolution vector by the resolution checker component 332 further comprises determining that the first resolution vector is compatible with the priority parameter, the resource utilization parameter, the dependency parameter, the real-time condition parameter, and/or the past event parameter associated with network device group(s) 310. These vectors are analyzed for right resolution instructions based current system conditions, prioritization, dependency, and/or the like.

Moreover, at block 414, the system may transform, via the instant resolver component 322 of the first edge node 320a, the first resolution vector into one or more solution instruction actions. The system may determine which systems need to implement the resolution. For instance, for load balancing type resolutions, the system may determine other component systems that have the processing capacity to supplement that of the first component system. The system constructs the one or more solution instruction actions which are structured to trigger the respective component systems (e.g., the first component system and/or other components systems that are required to implement the resolution) to implement the resolution in a step-by-step manner. The system, via the instant resolver component 322, may transmit the one or more solution instruction actions of the first resolution vector to a first micro edge adaptor (e.g., micro edge adaptor 302b) of a first component system (e.g., system B 314a) of the first network device group 310a associated with the first network issue event, as indicated by block 416.

Subsequently, at block 418, the system may implement, via the first micro edge adaptor (e.g., micro edge adaptor 302b) of the first component system (e.g., system B 314a), the one or more solution instruction actions of the first resolution vector at the first component system (e.g., system B 314a) of the first network device group 310a. Here, the first micro edge adaptor (e.g., micro edge adaptor 302b) of the first component system (e.g., system B 314a), is structured to transform the one or more solution instruction actions of the first resolution vector into a first technology format compatible with the first component system; and transmit the transformed one or more solution instruction actions to the first component system. In the instance where the resolution involves other component systems, the system may invoke their respective micro-adaptors and implement the solution instruction actions in a similar manner.

In some embodiments, the system may determine, via the proactive efficiency incrementor component 336 of the first edge node 320a of the one or more edge nodes 320, one or more auxiliary preventative instruction actions associated with the first network issue event. The one or more auxiliary preventative instruction actions are associated with precluding the first network issue event from occurring at the first component system and other component systems in the future. For instance, for a first network issue event of task failure due to scarce processing resources, the system may determine one or more auxiliary preventative instruction actions involving load balancing that are triggered when the processing resource level reaches 60% and prevents the processing resources from being exhausted or complement occupied. The system via the proactive efficiency incrementor component 336 may transmit the one or more auxiliary preventative instruction actions to the first micro edge adaptor (e.g., micro edge adaptor 302b) of the first component system (e.g., system B 314a) of the first network device group 310a. Subsequently, the system may implement, via the first micro edge adaptor (e.g., micro edge adaptor 302b) of the first component system (e.g., system B 314a), auxiliary preventative instruction actions at the first component system of the first network device group 310a.

In some embodiments, the system may determine, via the edge adaptor component 338 of the first edge node 320a, current resource parameters of the plurality of network device groups 310. The system via the edge adaptor component 338 may transmit custom load-balancing instructions to the plurality of network device groups 310 in response to determining a resource imbalance at the plurality of network device groups 310.

In some embodiments, the invention is structured for cross-pollination of the determined resolutions across component devices of the edge cluster. Here, based on determining similar network issue events in other component systems of the system, via the edge node, may automatically implement the determined resolution from blocks 412-414, without having to undertake the fully analysis and matching described above. Here, the system may retrieve, via the first edge node 320a of the one or more edge nodes 320, third application logs associated with the plurality of component systems of the first network device group 310a of the plurality of network device groups. Next, the system may determine, via first edge node 320a and the workflow component 334, a match between the third application logs and a prior application log associated with a prior network issue event (e.g., the first network issue event). The system may automatically implement the previously determined one or more resolution actions for the current network issue event.

In some embodiments, the invention is structured for cross-pollination of the determined resolutions across the disparate edge clusters. As discussed previously, the central server system 350 is structured to collect all the vectors from every edge node 320 and aggregate the same to determine global issue-resolution patterns in cloud vector store. In some embodiments, these global issue-resolution patterns are then synchronized to all edge nodes 320 on periodic basis, so that the edge node computation efficiency is increased without compromising the latency. In this way, the first edge node 320a of the one or more edge nodes may transmit, via the central server system, the first event vector and the one or more solution instruction actions to a second edge node 320n of the one or more edge nodes at a predetermined first time interval (e.g., a scheduled synchronization time).

Next, at a later time, the system may retrieve, via the second edge node 320n of the one or more edge nodes, second application logs associated with the plurality of component systems of a second network device group of the plurality of network device groups. The system may then determine a second network issue event associated with a second component system of the second network device group based on analyzing the second application logs at a second time interval after the first time interval, in a manner similar to that described previously. As described previously, the system may transform, via the second edge node 320n of the one or more edge nodes, the second application logs into a second event vector. In response to determining a match between at least a portion of the first event vector and the second event vector, the system may determine, via the second edge node of the one or more edge nodes, the first resolution vector associated with the first network issue event as a resolution vector for the second event vector. Here, the system may transmit, from the second edge node 320n of the one or more edge nodes, the one or more solution instruction actions of the first resolution vector to a second micro edge adaptor of the second component system of the second network device group associated with the second network issue event, and subsequently implement, via the second micro edge adaptor of the second component system, the one or more solution instruction actions of the first resolution vector at the second component system of the second network device group.

In some embodiments, in the event that the system was unsuccessful in determining resolution vectors the meet the similarity index threshold criteria, the system may transmit the unresolved event vectors to the central server system 350, where the unresolved vectors are analyzed and solved, and custom resolution vectors are constructed. Here, in some embodiments, the system may determine, via the first edge node 320a of the one or more edge nodes 320, the application logs to determine a second pattern associated with a second network issue event associated with the first network device group 310a. Subsequently, the system may transform, via the first edge node 320a of the one or more edge nodes 320, the application logs into one or more second event vectors, wherein the one or more second event vectors comprise a plurality of event parameters associated with the second network issue event. Here, the system may determine, via the first edge node 320a of the one or more edge nodes 320, that correlation of the one or more second event vectors is unsuccessful. In response, the system may then transmit, from the first edge node 320a, the one or more second event vectors to the central server system 350. The system, via the central server system 350 may analyze the one or more second event vectors, and determine one or more second resolution actions for the one or more second event vectors.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamic latency reduction through edge computation based on a multi-layered mechanism, wherein the system is structured for proactive de-centralized monitoring and resolution of network issue events and cross-pollination of resolutions of network issue events between network components and dynamic reallocation of technology resources therebetween for load balancing, comprising:
an entity communication network comprising:
a plurality of network device groups associated with a first layer of the entity communication network, wherein each network device group of the plurality of network device groups comprises a plurality of component systems, wherein each component system of the plurality of component systems is in operative communication with an associated micro edge adaptor;
one or more edge nodes associated with a second layer of the entity communication network, wherein each edge node of the one or more edge nodes is in operative communication with at least one of the plurality of network device groups; and
a central server system associated with a third layer of the entity communication network, wherein the central server system is in operative communication with the one or more edge nodes;
a memory device with computer-readable program code stored thereon;
a communication device, wherein the communication device is configured to establish operative communication with a plurality of networked devices via the entity communication network;
a processing device operatively coupled to the memory device and the communication device, wherein the processing device is configured to execute the computer-readable program code to:
retrieve, via a first edge node of the one or more edge nodes, first application logs associated with the plurality of component systems of a first network device group of the plurality of network device groups;
determine a first network issue event associated with a first component system of the first network device group based on analyzing the first application logs;
transform, via the first edge node of the one or more edge nodes, the first application logs into a first event vector, wherein the first event vector comprises a plurality of event parameters associated with the first network issue event;
transform, via the first edge node of the one or more edge nodes, a plurality of resolution actions into one or more resolution vectors, wherein each of the one or more resolution vectors comprise a plurality of resolution parameters;
determine, via the first edge node of the one or more edge nodes, a first resolution vector of the one or more resolution vectors for the first network issue event based on identifying a match between at least a portion of the first event vector and the first resolution vector, wherein the first resolution vector is compatible with a priority parameter, a resource utilization parameter, a dependency parameter, a real-time condition parameter, and past event parameter associated with the first network device group;
transform, via the first edge node of the one or more edge nodes, the first resolution vector into one or more solution instruction actions;

transmit, from the first edge node of the one or more edge nodes, the one or more solution instruction actions of the first resolution vector to a first micro edge adaptor of the first component system of the first network device group associated with the first network issue event; and implement, via the first micro edge adaptor of the first component system, the one or more solution instruction actions of the first resolution vector at the first component system of the first network device group.

2. The system of claim 1, wherein the processing device is further configured to execute the computer-readable program code to:

store the first application logs at an edge log store of the first edge node; and analyze, via the first edge node of the one or more edge nodes, the first application logs.

3. The system of claim 1, wherein the processing device is further configured to execute the computer-readable program code to:

determine a match between the first application logs and a prior application log associated with a prior network issue event; and in response to determining the match, determine that the first network device group is associated with the first network issue event.

4. The system of claim 1, wherein the first micro edge adaptor of the first component system is structured to store one or more frequent resolution vectors at the first micro edge adaptor for implementation at the first component system.

5. The system of claim 1, wherein the first micro edge adaptor of the first component system is structured to:

transform the one or more solution instruction actions of the first resolution vector into a first technology format compatible with the first component system; and transmit the transformed one or more solution instruction actions to the first component system.

6. The system of claim 1, wherein the processing device is further configured to execute the computer-readable program code to:

determine, via the first edge node of the one or more edge nodes, one or more auxiliary preventative instruction actions associated with the first network issue event;

transmit, from the first edge node of the one or more edge nodes, the one or more auxiliary preventative instruction actions to the first micro edge adaptor of the first component system of the first network device group; and implement, via the first micro edge adaptor of the first component system, auxiliary preventative instruction actions at the first component system of the first network device group.

7. The system of claim 1, wherein the processing device is further configured to execute the computer-readable program code to:

determine, via the first edge node of the one or more edge nodes, current resource parameters of the plurality of network device groups; and transmit custom load-balancing instructions to the plurality of network device groups in response to determining a resource imbalance at the plurality of network device groups.

8. The system of claim 1, wherein the processing device is further configured to execute the computer-readable program code to:

aggregate, via the first edge node of the one or more edge nodes, the first application logs to determine a first pattern associated with the first network issue event associated with the first network device group; and correlate, via the first edge node of the one or more edge nodes, the first pattern associated with the first network issue event with the plurality of resolution actions.

9. The system of claim 8, wherein the processing device is further configured to execute the computer-readable program code to:

analyze, via the first edge node of the one or more edge nodes, the first application logs to determine a second pattern associated with a second network issue event associated with the first network device group;

transform, via the first edge node of the one or more edge nodes, the first application logs into one or more second event vectors, wherein the one or more second event vectors comprise a plurality of event parameters associated with the second network issue event;

determine, via the first edge node of the one or more edge nodes, that correlation of the one or more second event vectors is unsuccessful;

transmit, from the first edge node, the one or more second event vectors to the central server system;

analyze, via the central server system, the one or more second event vectors; and determine, via the central server system, one or more second resolution actions for the one or more second event vectors.

10. The system of claim 1, wherein the processing device is further configured to execute the computer-readable program code to:

transmit, via the central server system, the first event vector and the one or more solution instruction actions from the first edge node of the one or more edge nodes to a second edge node of the one or more edge nodes at a predetermined first time interval.

11. The system of claim 10, wherein the processing device is further configured to execute the computer-readable program code to:

retrieve, via the second edge node of the one or more edge nodes, second application logs associated with the plurality of component systems of a second network device group of the plurality of network device groups;

determine a second network issue event associated with a second component system of the second network device group based on analyzing the second application logs at a second time interval after the first time interval;

transform, via the second edge node of the one or more edge nodes, the second application logs into a second event vector;

in response to determining a match between at least a portion of the first event vector and the second event vector, determine, via the second edge node of the one or more edge nodes, the first resolution vector associated with the first network issue event as a resolution vector for the second event vector;

transmit, from the second edge node of the one or more edge nodes, the one or more solution instruction actions of the first resolution vector to a second micro edge adaptor of the second component system of the second network device group associated with the second network issue event; and implement, via the second micro edge adaptor of the second component system, the one or more solution instruction actions of the first resolution vector at the second component system of the second network device group.

12. The system of claim 1, wherein the processing device is further configured to execute the computer-readable program code to:

retrieve, via the first edge node of the one or more edge nodes, third application logs associated with the plurality of component systems of the first network device group of the plurality of network device groups;

determine, via a workflow component, a match between the third application logs and a prior application log associated with a prior network issue event;

in response to determining the match, determine that the third application logs are associated with a current network issue event;

categorize the current network issue event into an issue category based on one or more event parameters; and determine one or more resolution actions for the current network issue event based on at least a prior resolution action associated with the prior network issue event.

13. The system of claim 1, wherein each of the one or more resolution vectors is associated with a prior network issue event, wherein for each of the one or more resolution vectors, the plurality of resolution parameters comprise (i) data associated with plurality of resolution actions, and (ii) one or more prior event parameters of the associated prior network issue event.

14. A computer program product for dynamic latency reduction through edge computation based on a multi-layered mechanism, wherein the computer program product is configured for proactive de-centralized monitoring and resolution of network issue events and cross-pollination of resolutions of network issue events between network components and dynamic reallocation of technology resources therebetween for load balancing, the computer program product comprising a non-transitory computer-readable storage medium having computer-executable instructions for causing a computer processor to:

retrieve, via a first edge node of one or more edge nodes, first application logs associated with a plurality of component systems of a first network device group of a plurality of network device groups;

determine a first network issue event associated with a first component system of the first network device group based on analyzing the first application logs;

transform, via the first edge node of the one or more edge nodes, the first application logs into a first event vector, wherein the first event vector comprises a plurality of event parameters associated with the first network issue event;

transform, via the first edge node of the one or more edge nodes, a plurality of resolution actions into one or more resolution vectors, wherein each of the one or more resolution vectors comprise a plurality of resolution parameters;

determine, via the first edge node of the one or more edge nodes, a first resolution vector of the one or more resolution vectors for the first network issue event based on identifying a match between at least a portion of the first event vector and the first resolution vector, wherein the first resolution vector is compatible with a priority parameter, a resource utilization parameter, a dependency parameter, a real-time condition parameter, and past event parameter associated with the first network device group;

transform, via the first edge node of the one or more edge nodes, the first resolution vector into one or more solution instruction actions;

transmit, from the first edge node of the one or more edge nodes, the one or more solution instruction actions of the first resolution vector to a first micro edge adaptor of the first component system of the first network device group associated with the first network issue event; and implement, via the first micro edge adaptor of the first component system, the one or more solution instruction actions of the first resolution vector at the first component system of the first network device group.

15. The computer program product of claim 14, wherein the non-transitory computer-readable storage medium further comprises computer-executable instructions for causing a computer processor to:

aggregate, via the first edge node of the one or more edge nodes, the first application logs to determine a first pattern associated with the first network issue event associated with the first network device group; and correlate, via the first edge node of the one or more edge nodes, the first pattern associated with the first network issue event with the plurality of resolution actions.

16. The computer program product of claim 14, wherein each of the one or more resolution vectors is associated with a prior network issue event, wherein for each of the one or more resolution vectors, the plurality of resolution parameters comprise (i) data associated with plurality of resolution actions, and (ii) one or more prior event parameters of the associated prior network issue event.

17. A computerized method for dynamic latency reduction through edge computation based on a multi-layered mechanism, wherein the computerized method is configured for proactive de-centralized monitoring and resolution of network issue events and cross-pollination of resolutions of network issue events between network components and dynamic reallocation of technology resources therebetween for load balancing, the computerized method comprising:

retrieving, via a first edge node of one or more edge nodes, first application logs associated with a plurality of component systems of a first network device group of a plurality of network device groups;

determining a first network issue event associated with a first component system of the first network device group based on analyzing the first application logs;

transforming, via the first edge node of the one or more edge nodes, the first application logs into a first event vector, wherein the first event vector comprises a plurality of event parameters associated with the first network issue event;

transforming, via the first edge node of the one or more edge nodes, a plurality of resolution actions into one or more resolution vectors, wherein each of the one or more resolution vectors comprise a plurality of resolution parameters;

determining, via the first edge node of the one or more edge nodes, a first resolution vector of the one or more resolution vectors for the first network issue event based on identifying a match between at least a portion of the first event vector and the first resolution vector, wherein the first resolution vector is compatible with a priority parameter, a resource utilization parameter, a dependency parameter, a real-time condition parameter, and past event parameter associated with the first network device group;

transforming, via the first edge node of the one or more edge nodes, the first resolution vector into one or more solution instruction actions;

transmitting, from the first edge node of the one or more edge nodes, the one or more solution instruction actions of the first resolution vector to a first micro edge adaptor of the first component system of the first network device group associated with the first network issue event; and implementing, via the first micro edge adaptor of the first component system, the one or more solution instruction actions of the first resolution vector at the first component system of the first network device group.

18. The computerized method of claim 17, wherein the computerized method further comprises:

aggregating, via the first edge node of the one or more edge nodes, the first application logs to determine a first pattern associated with the first network issue event associated with the first network device group; and correlating, via the first edge node of the one or more edge nodes, the first pattern associated with the first network issue event with the plurality of resolution actions.

19. The computerized method of claim 17, wherein each of the one or more resolution vectors is associated with a prior network issue event, wherein for each of the one or more resolution vectors, the plurality of resolution parameters comprise (i) data associated with plurality of resolution actions, and (ii) one or more prior event parameters of the associated prior network issue event.

* * * * *